United States Patent
Meng et al.

(10) Patent No.: US 10,547,211 B2
(45) Date of Patent: Jan. 28, 2020

(54) INTELLIGENT MULTI-MODE WIRELESS POWER TRANSMITTER SYSTEM

(71) Applicant: POWERSPHYR INC., Danville, CA (US)

(72) Inventors: David F. Meng, San Ramon, CA (US); William B. Wright, Boca Raton, FL (US)

(73) Assignee: PowerSphyr Inc., Danville, CA (US)

( * ) Notice: Subject to any disclaimer, the term of this patent is extended or adjusted under 35 U.S.C. 154(b) by 123 days.

(21) Appl. No.: 15/786,503

(22) Filed: Oct. 17, 2017

(65) Prior Publication Data
US 2018/0109146 A1    Apr. 19, 2018

Related U.S. Application Data

(60) Provisional application No. 62/409,802, filed on Oct. 18, 2016, provisional application No. 62/409,806,
(Continued)

(51) Int. Cl.
*H02J 7/00* (2006.01)
*H02J 50/12* (2016.01)
(Continued)

(52) U.S. Cl.
CPC ............. *H02J 50/12* (2016.02); *H02J 7/025* (2013.01); *H02J 7/027* (2013.01); *H04B 5/0037* (2013.01);
(Continued)

(58) Field of Classification Search
CPC .. H02J 5/005; H02J 50/10; H02J 50/12; H02J 5/00; H02J 7/025; H01L 23/66
(Continued)

(56) References Cited

U.S. PATENT DOCUMENTS 6,289,237 B1   9/2001  Mickle et al.
6,615,074 B2   9/2003  Mickle et al.
(Continued)

FOREIGN PATENT DOCUMENTS

EP    2387127 A2   11/2011
EP    2579424 A2    4/2013
(Continued)

OTHER PUBLICATIONS

Jorgesen et al., "Balun Basics Primer: A Tutorial on Baluns, Balun Transfromers, Magic-Ts, and 180° Hybrids," Marki Microwave, Inc, 2014, 12 pages.
(Continued)

*Primary Examiner* — Paul Dinh
(74) *Attorney, Agent, or Firm* — Knobbe, Martens, Olson & Bear, LLP

(57) ABSTRACT

A device including a processor configured to identify a power receiving device and to determine a range configuration relative to the power receiving device is provided. The device also includes a first antenna configured to emit a propagating radiation at a selected frequency and in a selected direction, and a first power transmitting circuit configured to provide a signal at the selected frequency to the first antenna when the processor identifies the power receiving device within a far field configuration from the device. The device also includes a plate, configured to couple a ground terminal of the first power transmitting circuit with the first antenna and including a planar surface and at least an extension angled in a direction of increased directivity of the propagating radiation. Methods for fabricating and using a device as above are also provided.

12 Claims, 19 Drawing Sheets

Related U.S. Application Data filed on Oct. 18, 2016, provisional application No. 62/409,811, filed on Oct. 18, 2016.

(51) Int. Cl.
 *H02J 7/02* (2016.01)
 *H04B 5/00* (2006.01)
 *H02M 1/12* (2006.01)

(52) U.S. Cl.
 CPC ......... *H04B 5/0075* (2013.01); *H04B 5/0093* (2013.01); *H02M 1/12* (2013.01)

(58) Field of Classification Search
 USPC .................................. 343/754, 866; 320/108
 See application file for complete search history.

(56) References Cited

U.S. PATENT DOCUMENTS

| | | | |
|---|---|---|---|
| 6,856,291 B2 | 2/2005 | Mickle et al. | |
| 6,886,685 B2 | 5/2005 | Slater | |
| 7,027,311 B2 | 4/2006 | Vanderelli et al. | |
| 7,057,514 B2 | 6/2006 | Mickle et al. | |
| 7,639,994 B2 | 12/2009 | Greene et al. | |
| 7,643,312 B2 | 1/2010 | Vanderelli et al. | |
| 7,741,734 B2 | 6/2010 | Joannopoulos et al. | |
| 7,812,771 B2 | 10/2010 | Greene et al. | |
| 7,825,543 B2 | 11/2010 | Karalis et al. | |
| 7,844,306 B2 | 11/2010 | Shearer et al. | |
| 7,868,482 B2 | 1/2011 | Greene et al. | |
| 7,898,105 B2 | 3/2011 | Greene et al. | |
| D636,333 S | 4/2011 | Kulikowski | |
| 7,925,308 B2 | 4/2011 | Greene et al. | |
| 8,022,576 B2 | 9/2011 | Joannopoulos et al. | |
| 8,035,255 B2 | 10/2011 | Kurs et al. | |
| 8,076,800 B2 | 12/2011 | Joannopoulos et al. | |
| 8,076,801 B2 | 12/2011 | Karalis et al. | |
| 8,084,889 B2 | 12/2011 | Joannopoulos et al. | |
| 8,097,983 B2 | 1/2012 | Karalis et al. | |
| 8,115,448 B2 | 2/2012 | John | |
| 8,159,090 B2 | 4/2012 | Greene et al. | |
| 8,159,364 B2 | 4/2012 | Zeine | |
| 8,304,935 B2 | 11/2012 | Karalis et al. | |
| 8,324,759 B2 | 12/2012 | Karalis et al. | |
| 8,362,651 B2 | 1/2013 | Haman et al. | |
| 8,378,522 B2 | 2/2013 | Cook et al. | |
| 8,395,282 B2 | 3/2013 | Joannopoulos et al. | |
| 8,395,283 B2 | 3/2013 | Joannopoulos et al. | |
| 8,400,017 B2 | 3/2013 | Kurs et al. | |
| 8,400,018 B2 | 3/2013 | Joannopoulos et al. | |
| 8,400,019 B2 | 3/2013 | Joannopoulos et al. | |
| 8,400,020 B2 | 3/2013 | Joannopoulos et al. | |
| 8,400,021 B2 | 3/2013 | Joannopoulos et al. | |
| 8,400,022 B2 | 3/2013 | Joannopoulos et al. | |
| 8,400,023 B2 | 3/2013 | Joannopoulos et al. | |
| 8,400,024 B2 | 3/2013 | Joannopoulos et al. | |
| 8,410,636 B2 | 4/2013 | Kurs et al. | |
| 8,410,953 B2 | 4/2013 | Zeine | |
| 8,432,062 B2 | 4/2013 | Greene et al. | |
| 8,441,154 B2 | 5/2013 | Karalis et al. | |
| 8,446,248 B2 | 5/2013 | Zeine | |
| 8,461,719 B2 | 6/2013 | Kesler et al. | |
| 8,461,720 B2 | 6/2013 | Kurs et al. | |
| 8,461,721 B2 | 6/2013 | Karalis et al. | |
| 8,461,722 B2 | 6/2013 | Kurs et al. | |
| 8,461,817 B2 | 6/2013 | Martin et al. | |
| 8,466,583 B2 | 6/2013 | Karalis et al. | |
| 8,471,410 B2 | 6/2013 | Karalis et al. | |
| 8,476,788 B2 | 7/2013 | Karalis et al. | |
| 8,482,158 B2 | 7/2013 | Kurs et al. | |
| 8,487,480 B1 | 7/2013 | Kesler et al. | |
| 8,497,601 B2 | 7/2013 | Hall et al. | |
| D692,010 S | 10/2013 | Verghese | |
| 8,552,592 B2 | 10/2013 | Schatz et al. | |
| 8,558,661 B2 | 10/2013 | Leine | |
| 8,587,153 B2 | 11/2013 | Schatz et al. | |
| 8,587,155 B2 | 11/2013 | Giler et al. | |
| 8,598,743 B2 | 12/2013 | Hall et al. | |
| 8,618,696 B2 | 12/2013 | Kurs et al. | |
| 8,621,245 B2 | 12/2013 | Shearer et al. | |
| D697,477 S | 1/2014 | Jonas, III | |
| 8,629,578 B2 | 1/2014 | Kurs et al. | |
| 8,643,326 B2 | 2/2014 | Campanella et al. | |
| 8,667,452 B2 | 3/2014 | Verghese et al. | |
| 8,669,676 B2 | 3/2014 | Karalis et al. | |
| 8,686,598 B2 | 4/2014 | Schatz et al. | |
| 8,692,410 B2 | 4/2014 | Schatz et al. | |
| 8,692,412 B2 | 4/2014 | Fiorello et al. | |
| D705,745 S | 5/2014 | Kurs et al. | |
| 8,716,903 B2 | 5/2014 | Kurs et al. | |
| 8,723,366 B2 | 5/2014 | Fiorello et al. | |
| 8,729,737 B2 | 5/2014 | Schatz et al. | |
| 8,760,007 B2 | 6/2014 | Joannopoulos et al. | |
| 8,760,008 B2 | 6/2014 | Joannopoulos et al. | |
| D709,855 S | 7/2014 | Jonas | |
| 8,766,485 B2 | 7/2014 | Joannopoulos et al. | |
| 8,772,971 B2 | 7/2014 | Joannopoulos et al. | |
| 8,772,972 B2 | 7/2014 | Joannopoulos et al. | |
| 8,772,973 B2 | 7/2014 | Kurs | |
| 8,791,599 B2 | 7/2014 | Joannopoulos et al. | |
| 8,805,530 B2 | 8/2014 | John | |
| 8,836,172 B2 | 9/2014 | Haman et al. | |
| 8,847,548 B2 | 9/2014 | Kesler et al. | |
| 8,854,176 B2 | 10/2014 | Zeine | |
| 8,875,086 B2 | 10/2014 | Verghese et al. | |
| 8,901,778 B2 | 12/2014 | Kesler et al. | |
| 8,901,779 B2 | 12/2014 | Kesler et al. | |
| 8,907,531 B2 | 12/2014 | Hall et al. | |
| 8,928,276 B2 | 1/2015 | Kesler et al. | |
| 8,937,408 B2 | 1/2015 | Ganem et al. | |
| D722,048 S | 2/2015 | Kurs et al. | |
| 8,963,488 B2 | 2/2015 | Campanella et al. | |
| 9,000,616 B2 | 4/2015 | Greene et al. | |
| 9,021,277 B2 | 4/2015 | Shearer et al. | |
| 9,142,973 B2 | 9/2015 | Zeine | |
| 9,143,000 B2 | 9/2015 | Leabman et al. | |
| 9,240,824 B2 | 1/2016 | Hillan et al. | |
| 9,608,472 B2 | 3/2017 | Moshfeghi | |
| 2002/0128052 A1* | 9/2002 | Neagley | G01S 13/756 455/575.1 |
| 2004/0150934 A1 | 8/2004 | Baarman | |
| 2005/0052334 A1* | 3/2005 | Ogino | H01Q 1/1271 343/866 |
| 2005/0206577 A1 | 9/2005 | Lee | |
| 2006/0028386 A1* | 2/2006 | Ebling | H01Q 13/24 343/754 |
| 2008/0054638 A1 | 3/2008 | Greene et al. | |
| 2010/0127660 A1 | 5/2010 | Cook et al. | |
| 2010/0190436 A1 | 7/2010 | Cook et al. | |
| 2010/0244576 A1 | 9/2010 | Hillan et al. | |
| 2012/0062358 A1 | 3/2012 | Nowottnick | |
| 2012/0077447 A1* | 3/2012 | Rofougaran | H01L 23/66 455/73 |
| 2013/0026981 A1 | 1/2013 | Van Der Lee | |
| 2013/0221915 A1 | 8/2013 | Son et al. | |
| 2014/0063676 A1* | 3/2014 | Sigalov | H05B 6/645 361/143 |
| 2014/0327323 A1 | 11/2014 | Masaoka et al. | |
| 2015/0011160 A1 | 1/2015 | Jurgovan et al. | |
| 2016/0020637 A1 | 1/2016 | Khlat | |
| 2016/0285489 A1 | 9/2016 | Gong et al. | |
| 2016/0301257 A1 | 10/2016 | Parks et al. | |

FOREIGN PATENT DOCUMENTS

| | | |
|---|---|---|
| EP | 2755300 A1 | 7/2014 |
| WO | WO 2015064815 A1 | 5/2015 |
| WO | 2016164321 A1 | 10/2016 |

OTHER PUBLICATIONS

International Search Report & Written Opinion for PCT Application PCT/US2017/057015 dated Jan. 18, 2018, 23 pages.

(56) References Cited

OTHER PUBLICATIONS

International Search Report & Written Opinion for PCT Application PCT/US2017/026186 dated Jul. 14, 2017, 17 pages.

* cited by examiner

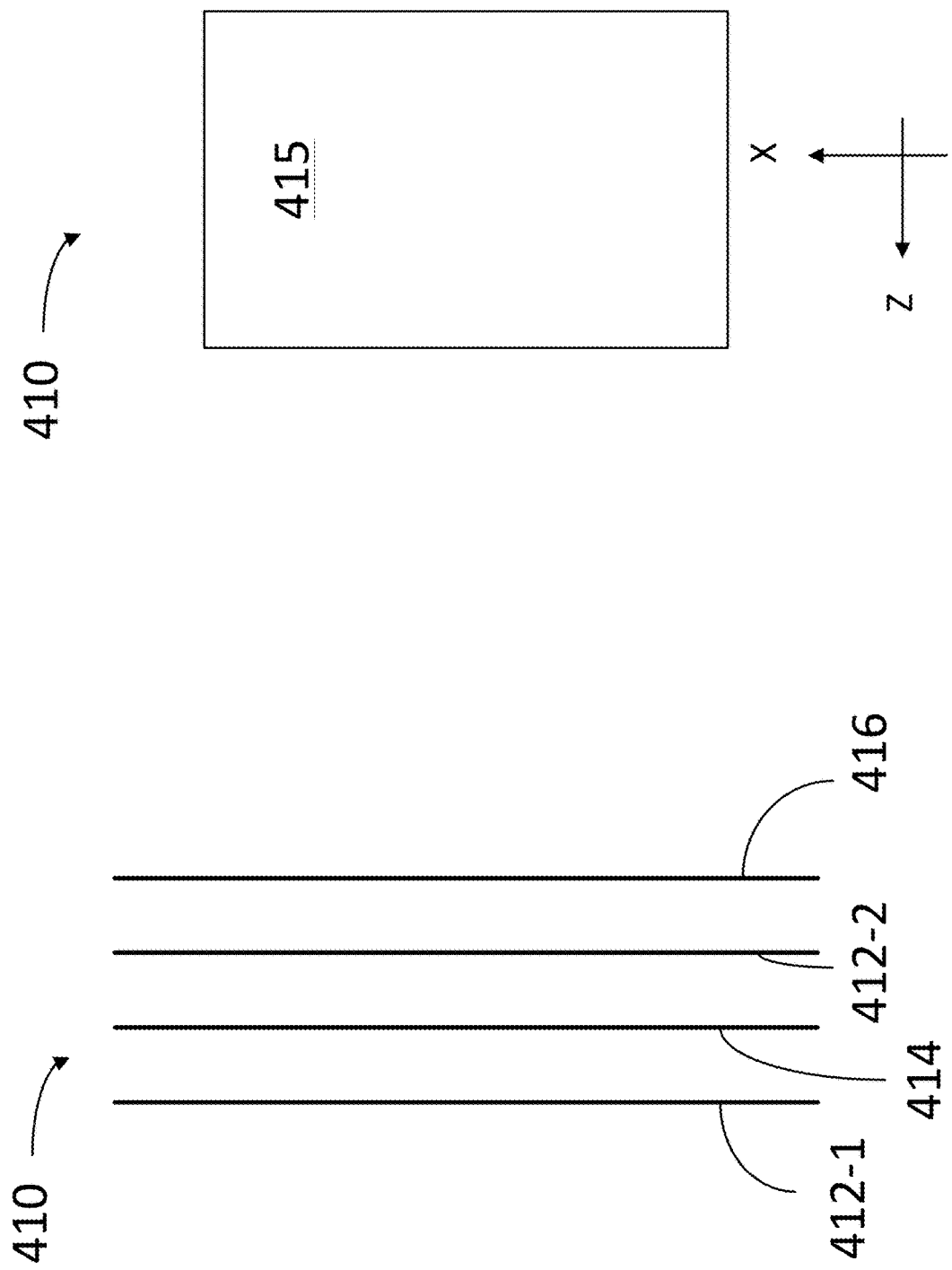

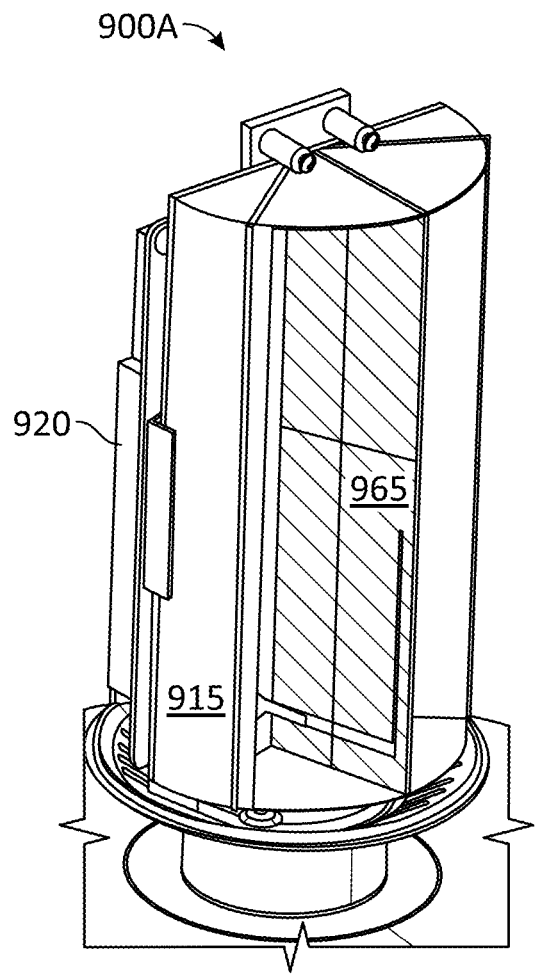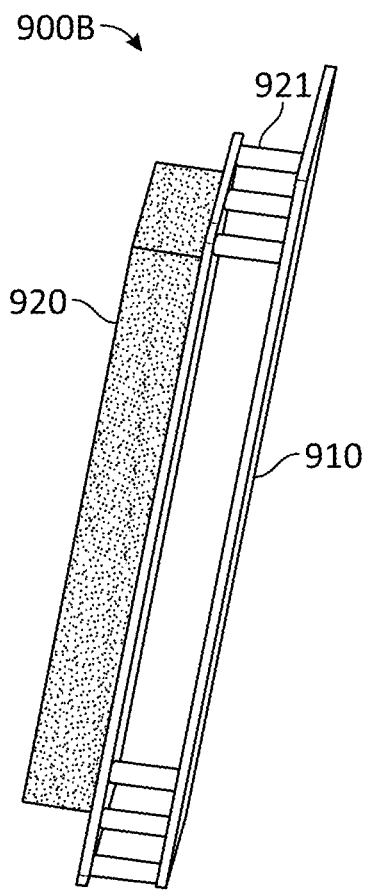
FIG. 9A
FIG. 9B

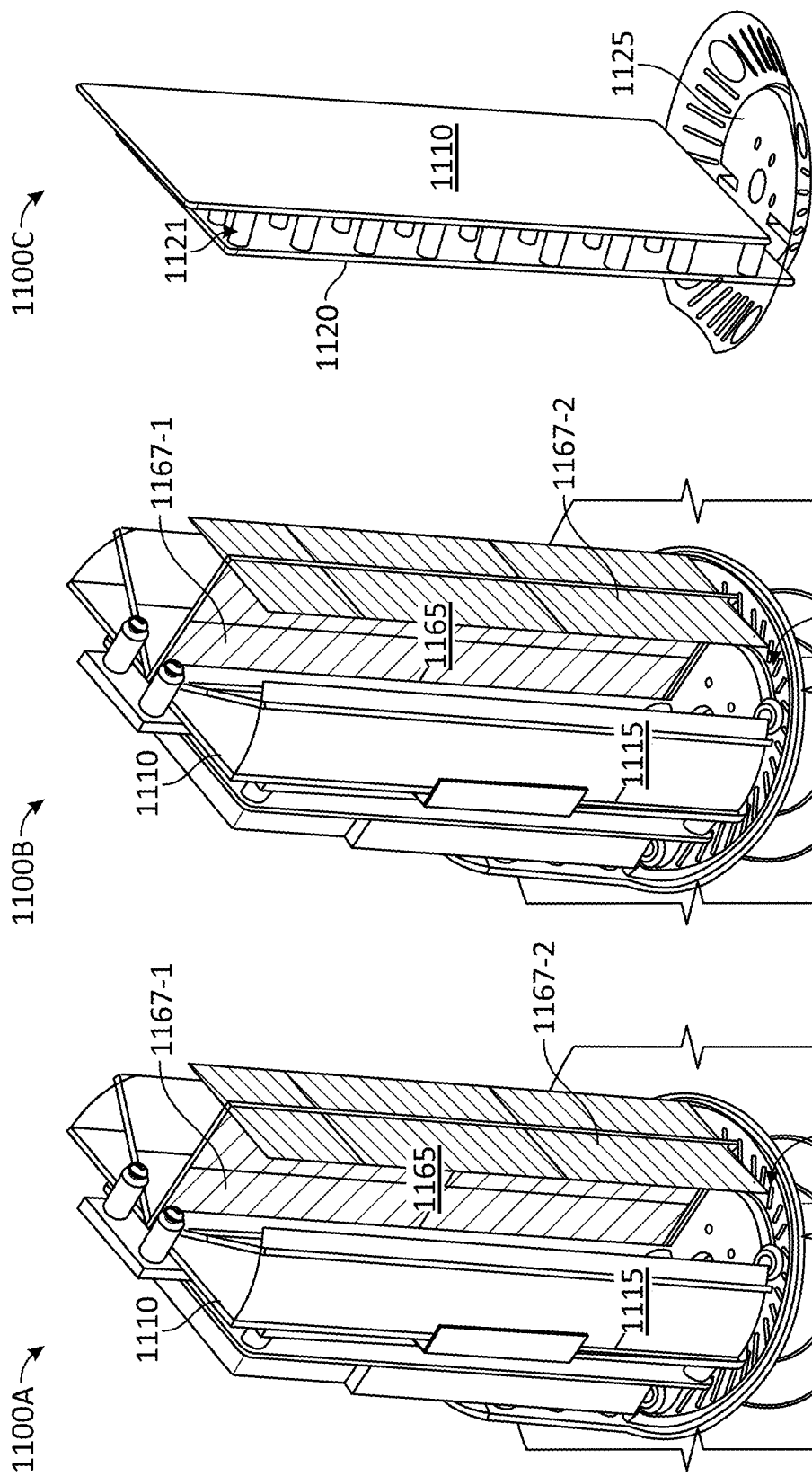

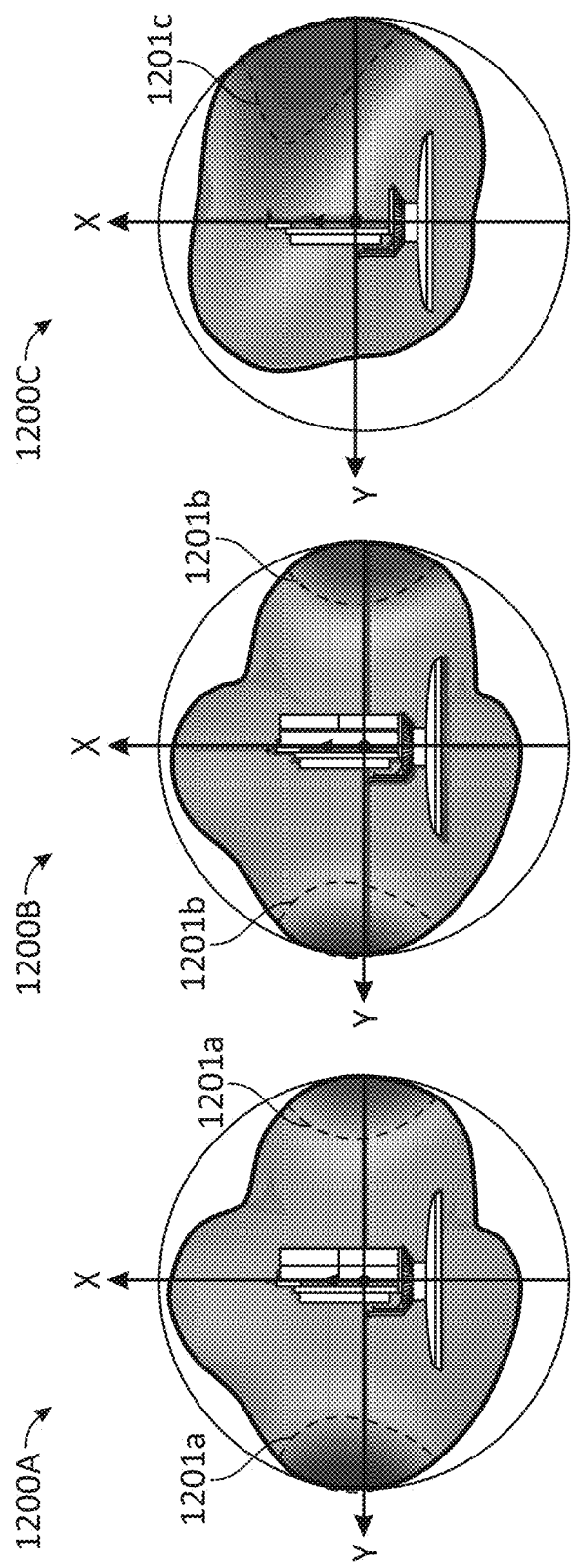

INTELLIGENT MULTI-MODE WIRELESS POWER TRANSMITTER SYSTEM

CROSS-REFERENCE TO RELATED APPLICATIONS

The present application claims priority to U.S. Provisional Patent Application Ser. No. 62/409,802, entitled "INTELLIGENT MULTI-MODE WIRELESS POWER SYSTEM," to U.S. Provisional Patent Application Ser. No. 62/409,806, entitled "MULTI-MODE ENERGY RECEIVER SYSTEM," and to U.S. Provisional Patent Application Ser. No. 62/409,811, entitled "MULTI-MODE WIRELESSLY RECHARGEABLE BATTERY SYSTEM," all to David F. Meng and William B. Wright, and filed on Oct. 18, 2016, the contents of which are hereby incorporated by reference in their entirety for all purposes.

BACKGROUND OF THE DISCLOSURE

Field of the Disclosure

The present disclosure relates to providing wireless power to electric or electronic devices, and more particularly to improving the wireless transfer of power to devices for charging and/or sustaining power to those devices' loads.

Description of the Related Art

Common electric or electronic devices consume significant levels of electric power with use and a considerable amount of usage occurs while away from main alternate current (AC) power sources traditionally used to supply power to such devices. Due to battery storage limitations, the need for frequent recharging exists in order to sustain device operation. Furthermore, the prevalence of portable electronic devices and devices operating in areas where immediate physical connection with a traditional power source is unavailable has resulted in increased complexity for management and maintenance of connected electrical power adapters and traditional power sources dependent on power conducting cables.

Current solutions to this problem are based on a singular type of wireless power transfer typically involving restrictions on use and distance that result in either higher power at short distances or lower power at greater distances.

SUMMARY

In certain embodiments, a device is provided that includes a processor configured to identify a power receiving device and to determine a range configuration relative to the power receiving device. The device also includes a first antenna configured to emit a propagating radiation at a selected frequency and in a selected direction, and a first power transmitting circuit configured to provide a signal at the selected frequency to the first antenna when the processor identifies the power receiving device within a far field configuration from the device. The device also includes a plate, configured to couple a ground terminal of the first power transmitting circuit with the first antenna and including a planar surface and at least an extension angled in a direction of increased directivity of the propagating radiation.

In certain embodiments, a method is provided that includes selecting a radio-frequency antenna, mechanically coupling a plate to the radio-frequency antenna in a first antenna assembly, and electrically coupling the plate with a ground terminal in a radio-frequency transmitter circuit that provides a radio-frequency signal to the radio-frequency antenna to transmit to a power receiving unit. The method also includes identifying a degree of anisotropy in an electromagnetic field emitted by the radio-frequency antenna, and adjusting a location and a geometry of the radio-frequency antenna and a location and a geometry of the plate to increase a directivity of the radio-frequency signal in a selected direction, based on the degree of anisotropy in the electromagnetic field emitted by the radio-frequency antenna.

In certain embodiments, a method is provided that includes identifying, with a power transferring unit, a power receiving unit in a proximity of the power transferring unit, and determining whether the power receiving unit is in a near field range or in a far field range of the power transferring unit. The method also includes receiving a power status information from the power receiving unit, and generating, in the power transferring unit and based on the power status information, a directed energy signal from the power transferring unit to the power receiving unit, when the power receiving unit is within a far range of the power transferring unit. The method also includes generating, in the power transferring unit and based on the power status information, an inductively coupled field that is resonant with the power receiving unit, when the power receiving unit is within at least a near field range of the power transferring unit.

In certain embodiments, a device is provided that includes a means to store instructions and a means to execute the instructions. When the means to execute the instructions executes the instructions, it causes the device to perform a method including steps to identify, with a power transferring unit, a power receiving unit in a proximity of the power transferring unit, and to determine whether the power receiving unit is in a near field range or in a far field range of the power transferring unit. The means to execute instructions also executes instructions to receive a power status information from the power receiving unit, and to generate, in the power transferring unit and based on the power status information, a directed energy signal from the power transferring unit to the power receiving unit, when the power receiving unit is within a far range of the power transferring unit. The means to execute instructions also executes instructions to generate, in the power transferring unit and based on the power status information, an inductively coupled field that is resonant with the power receiving unit, when the power receiving unit is within at least a near field range of the power transferring unit.

BRIEF DESCRIPTION OF THE DRAWINGS

FIGS. 4A-B illustrate a cross section view and a plan view of a ground plate, according to some embodiments.

FIGS. 9A-B illustrate perspective views of RF antenna assemblies in a monopole configuration, according to some embodiments.

FIGS. 11A-C illustrate perspective views of RF antenna assemblies in a larger monopole configuration relative to that of FIGS. 9A-B, according to some embodiments.

FIGS. 12A-C illustrate electromagnetic propagation results from the RF antenna assemblies of FIGS. 11A-C, according to some embodiments.

DETAILED DESCRIPTION OF THE DISCLOSURE

Figure 1A:
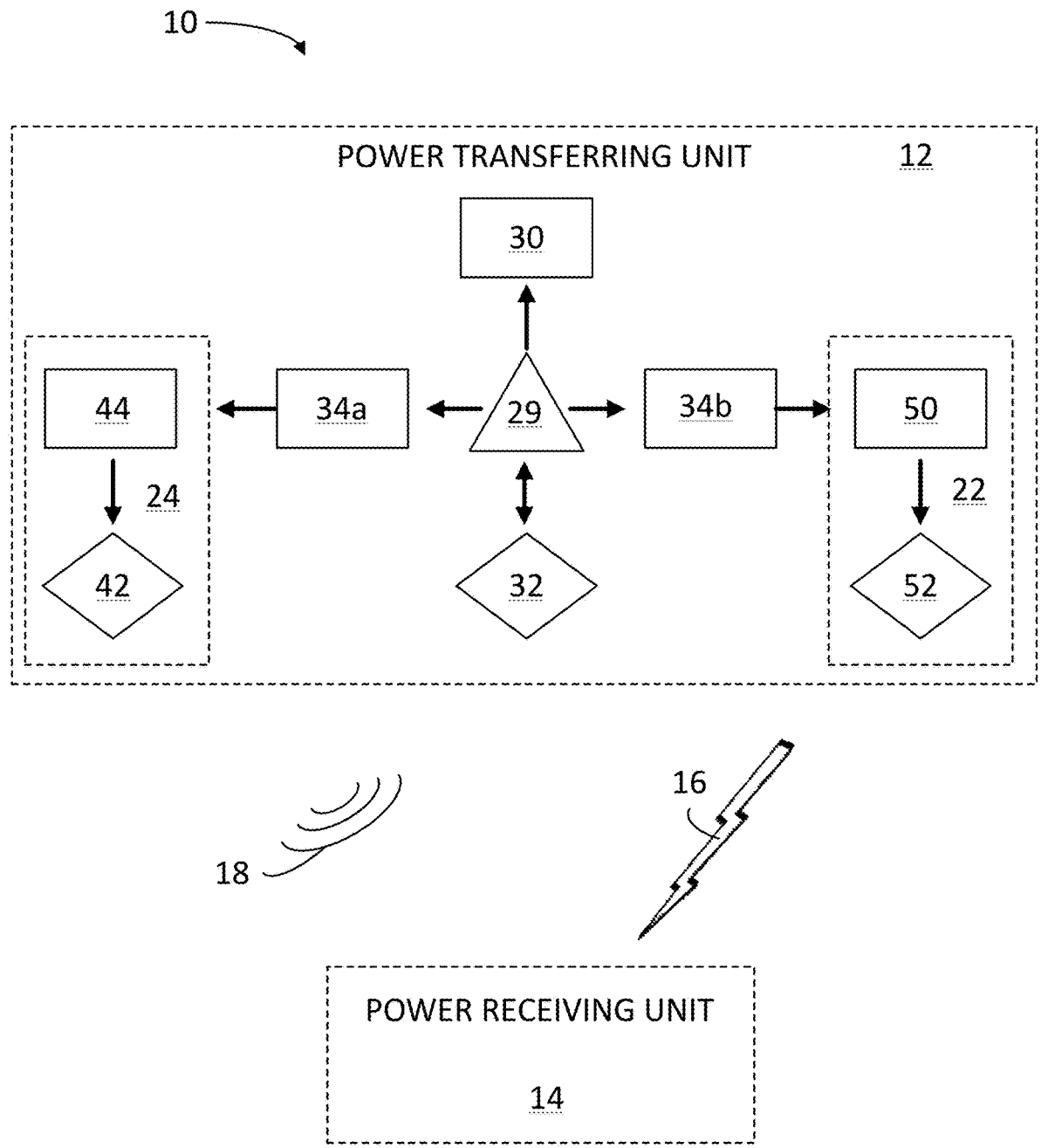
FIG. 1A is a schematic illustration of a system for providing intelligent wireless power to a device load, including a power transfer unit (PTU) and a power receiving unit (PRU), according to some embodiments.

In autonomous, mobile electronic appliances, power management is an issue that has direct impact in the performance and market advantage for the device. Thus, in many applications it is desirable to have extra mobility and autonomy for users as provided by embodiments disclosed herein. For example, in the area of medical devices such as implanted pacemakers and the like, having autonomy from battery recharge is desired as much as technologically feasible. Indeed, battery replacement in such configurations may involve complicated medical, or even surgical procedures. To the extent that these procedures can be avoided, or made more infrequent, embodiments as disclosed herein provide an extended power lifetime of the battery of such devices. The present disclosure provides embodiments of intelligent systems that provide a multi-mode wireless power delivery solution without the limitations of conventional systems.

In the field of automotive applications, some embodiments as disclosed herein provide a central power transmitting unit that can wirelessly access multiple mobile devices (e.g., cell phones, laptops, notepads, and the like) within the enclosure of a car by maximizing the charge points throughout the vehicle. Accordingly, in embodiments as disclosed herein a driver can focus on the road rather than in looking for a plug to connect a power cord for a device, thereby enhancing road safety and the convenience of multiple charging points.

In one aspect, the present disclosure is embodied as a system and method of providing wireless power intelligently to a device load. Accordingly, embodiments consistent with the present disclosure transmit a directed power signal wirelessly from a power transferring unit (PTU) to a power receiving unit (PRU) in a first mode of operation (e.g., when the PRU is in the proximity of a far field range of the PTU). In other aspects, embodiments as disclosed herein include generating a field (e.g., a resonant magnetic field) wirelessly and inductively coupled to the PRU at a resonant frequency of a receiver circuit in a second mode of operation (e.g., when the PRU is in the proximity of a near field range of the PTU). Accordingly, in embodiments consistent with the present disclosure, a power transfer from the PTU to the PRU is managed selectively and efficiently. Embodiments as disclosed herein deliver power as desired in the first mode of operation, the second mode of operation, or a combination of both modes simultaneously. Furthermore, embodiments as disclosed herein take into consideration a power requirement of the PRU, and its range relative to the PTU. In some embodiments, a PTU may transfer power to a plurality of PRU's, sorted according to a prioritization that takes into account the power requirements and range of each PRU relative to the PTU.

In one embodiment, the PTU includes a far field transmitter configured to wirelessly transmit a directed power signal. The PTU also includes a source resonator configured to generate a resonant magnetic field for inductively coupling power to the PRU in the near field range. The PRU includes a far field receiver configured to wirelessly receive the directed power signal transmitted from the far field transmitter. The PRU may also include a capture resonator configured to inductively capture resonant magnetic power in the near field generated by the source resonator.

Some embodiments include a method of managing multimode transfer of wireless power. The method includes optimizing the wireless transfer of power from the PTU in at least the first mode of operation, the second mode of operation, or the two modes of operation simultaneously. The method includes capturing and receiving the optimized power transferred wirelessly over varying distances by one or more power receiving units (PRU's). Some embodiments include a micro-computer circuit (MCC) configured to dynamically update a status of a range configuration between the PRU and the PTU to maximize the amount of power transferred between the devices in a dual mode, when available. Furthermore, some embodiments include a power harvesting configuration that exploits the large amount of unused digital data propagating at RF frequencies wirelessly to convert the digital signals into power transferred to the PRU. In such configuration, the MCC includes the reception and availability of the digital signals for harvesting. Moreover, in some embodiments the MCC is further configured to prioritize the desire for power for one or more PRU's in close proximity of the PTU. Thus, the load on the PTU is optimized for the needs of the one or multiple PRU's benefiting from the power transfer.

The present disclosure addresses the shortcomings of existing single-mode wireless power delivery systems such as low power transfer from a far field source or the limited spatial freedom of near field power transfer inherent to these technologies. At the same time, embodiments consistent with the present disclosure obviate a need for traditional wired or cabled power delivery methods. Advantages of the present disclosure include increased efficiency, added redundancy for applications where critical loss of available power could be detrimental to the user and optional spatial versatility when lower power transfer rates are acceptable while providing power to or charging an electric or electronic device.

In some embodiments, it is desirable that the total output of an antenna assembly for a PTU as disclosed herein be less than one Watt, with a power about 6 dBi maximum directional gain. Some embodiments of a PTU consistent with the present disclosure may include a higher directivity and performance variation depending on design details. Further, the mechanical consistency of the antenna assembly may be adjusted according to a desired performance specification.

Embodiments as disclosed herein may include a ceramic-based (e.g., high dielectric constant) antenna with additional mechanical modifications to improve directivity of power transmission. Further, some embodiments include similar mechanical modifications combined with alternative antenna designs. Based on the specific application, a specific antenna design may be selected according to a desired transmission pattern. The transmission pattern may include a specific direction for maximum power transmission (e.g., directivity) and a range of directions that provide enhanced power transmission (including the maximum power transmission).

FIG. 1A illustrates a system for providing intelligent wireless power to a device load in accordance with the principles of the present disclosure, designated generally as 10. The system 10 includes PTU 12 and PRU 14. PTU 12 is configured to transmit a directed power signal 16 wirelessly in a first mode of operation to PRU 14. In some embodiments, PTU 12 is further configured to generate an inductively coupled field (e.g., a resonant magnetic field) 18 wirelessly in a second mode of operation. PRU 14 is configured to receive the directed power signal 16 from PTU 12 when PRU 14 is in the far field range of PTU 12. Further, PRU 14 is also configured to inductively couple a magnetic field thereof to the inductively coupled field 18 in the second mode when PRU 14 is in the proximity of a near field range of PTU 12, as will be explained in detail below.

PTU 12 includes a far field transmitter 22 configured to wirelessly transmit the directed power signal 16 and a source resonator 24 configured to generate the inductively coupled field 18. In one embodiment, PTU 12 includes a micro-controller circuit (MCC) 29 operatively connected to a power source 30 and configured to intelligently induce wireless transfer of power within the near field, far field or both as required, and to manage the distribution and priorities of power transfer. A communications circuit 32 is configured to establish communication between PTU 12 and PRU 14. PTU amplifier/rectifier circuits 34a and 34b (hereinafter, collectively referred to as "rectifier circuits 34") are configured to convert the power for the source resonator 24 and the far field transmitter 22, respectively.

In one embodiment, source resonator 24 includes a source coil 42 operatively connected to an impedance matching circuit (IMC) 44. A far field transmitter 22 includes a signal conversion module 50 and a far field transmitter antenna(s) 52 whereby the amplified/rectified power is converted by the signal conversion module 50 to a power signal suitable for transmission via a far field transmitter antenna(s) 52.

The transmitters and resonators convert RF power to power signals at an Industrial, Scientific, and Medical (ISM) frequency band appropriately optimized for the application of the system and in accordance with regulatory rules and laws governing such wireless operations.

Figure 1B:
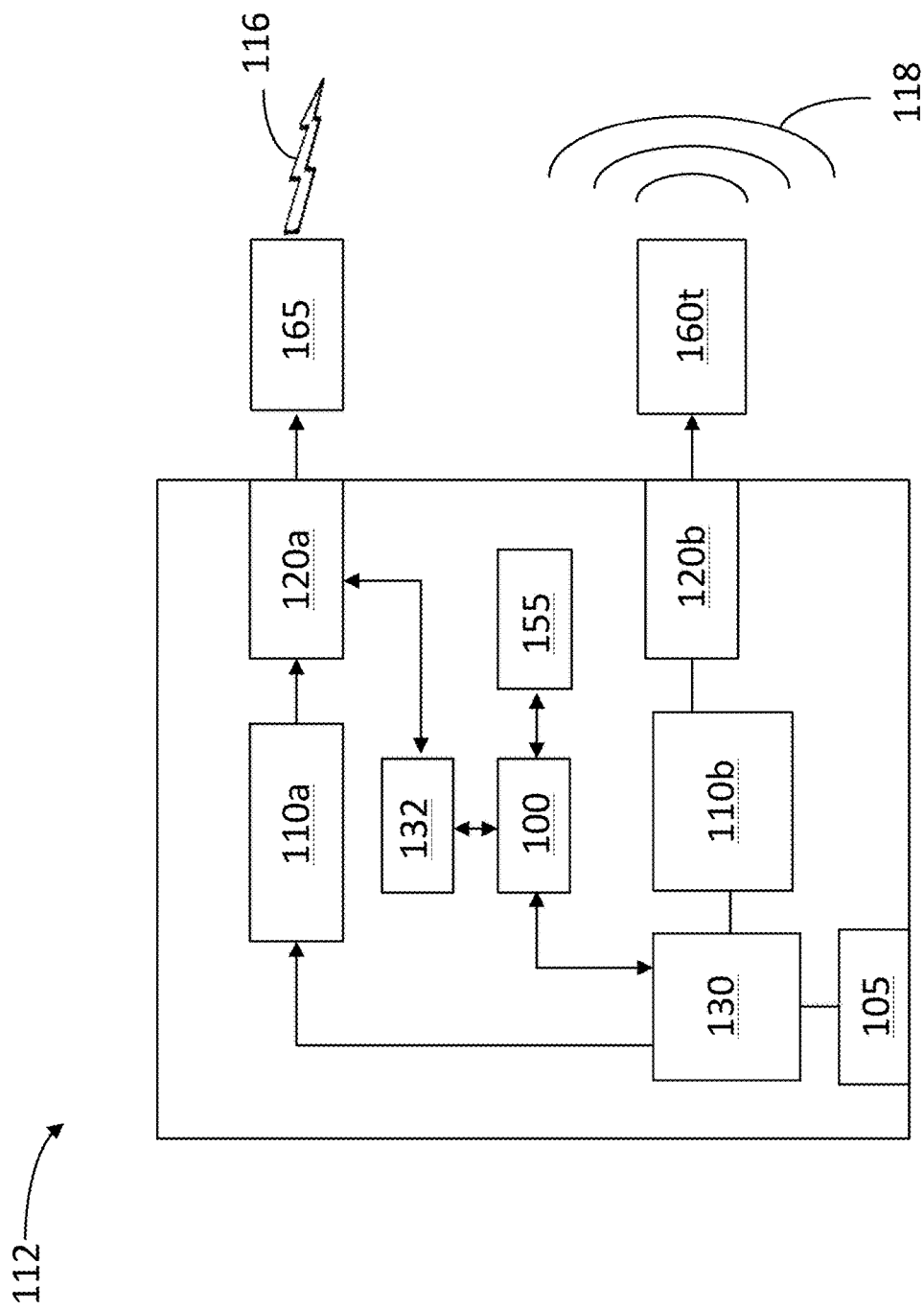
FIG. 1B is a schematic illustration of a PTU including a USB socket for an external power supply, according to some embodiments.

FIG. 1B is a schematic illustration of a PTU 112, according to some embodiments. In some embodiments, PTU 112 is configured to wirelessly transmit a directed power signal 116 using an antenna 165 (e.g., a RF antenna) to PRU 14 located at least within a far field range from PTU 112, in a first mode of operation (e.g., "far range" mode, a). Antenna 165 may be a far field transmitter configured to wirelessly transmit the directed power signal to PRU 14 located within the far range of PTU 112. Directed power signal 116 may include a RF propagating signal suitably tuned to a resonant receiver circuit in PRU 14 (e.g., at 915 MHz). Moreover, in some embodiments the directed power signal may also include a selected directionality for the RF propagating signal to make more efficient the power transfer between PTU 112 and the PRU 14.

In some embodiments, PTU 112 may also be configured to generate an inductively coupled field 118 with a Tx resonator 160t, which is resonant with a receiver circuit in PRU 14. Tx resonator 160t generates an inductively coupled field 118. Inductively coupled field 118 may include a RF modulated magnetic field wirelessly transmitted across a near range in a second mode of operation of PTU 112 (e.g., "near field" mode, b). In some embodiments, Tx resonator 160t is configured to generate a magnetic induction field (e.g., inductively coupled power signal 118) modulated at approximately 6.78 MHz. In some embodiments, and without limitation, the magnetic field may be modulated at a lower frequency, e.g., 1 MHz, 100's of kHz, or even lower frequencies such as between 90-300 kHz, depending on range, power, and other design configurations.

PTU 112 further includes a micro-controller circuit (MCC) 100 operatively coupled to a memory circuit 155 and configured to cause PTU 12 to perform a wireless transfer of power in the far field mode of operation (a), the near field mode of operation (b) or both, as required. In some embodiments, MCC 100 may be as MCC 29, described in detail above. Further, in some embodiments MCC 100 is configured to manage the distribution and priorities of a power transfer between PTU 12 and multiple PRUs 14. Accordingly, in some embodiments, PTU 112 includes a communications circuit 132 (e.g., communications circuit 32) configured to communicate information between PTU 112 and PRU 14. The RF power signal is provided by a RF power supply 130 to either one of amplifier 110a or amplifier 110b (hereinafter, collectively referred to as "amplifiers 110"). In some embodiments, RF power supply 130 is controlled by MCC 100.

Amplifier 110a and passively tuning IC (PTIC) 120a are configured to provide an amplified RF signal to antenna 165, the amplified RF signal tuned to a frequency that is resonant with a receiver circuit in PRU 14. Further, in some embodiments, PTIC 120 includes a coil operatively coupled with an impedance matching circuit (IMC). Likewise, amplifier 110b and PTIC 120b are configured to provide an amplified RF signal to Tx resonator 160t. PTIC 120a and PTIC 120b will be hereinafter, collectively referred to as PTICs 120, and amplifiers 110a and 110b will be collectively referred to, hereinafter, as amplifiers 110. In some embodiments, PTICs 120 may be configured to amplify a signal, or may be integrated with amplifiers 110 to provide a tuned, amplified signal.

In some embodiments, PTU 112 may be wired to an external power supply (e.g., a computer, a centralized service station, a wall power, and the like) and configured to receive power resources. Accordingly a USB-Socket 105 may couple PTU 112 with the external power supply.

Figure 2:
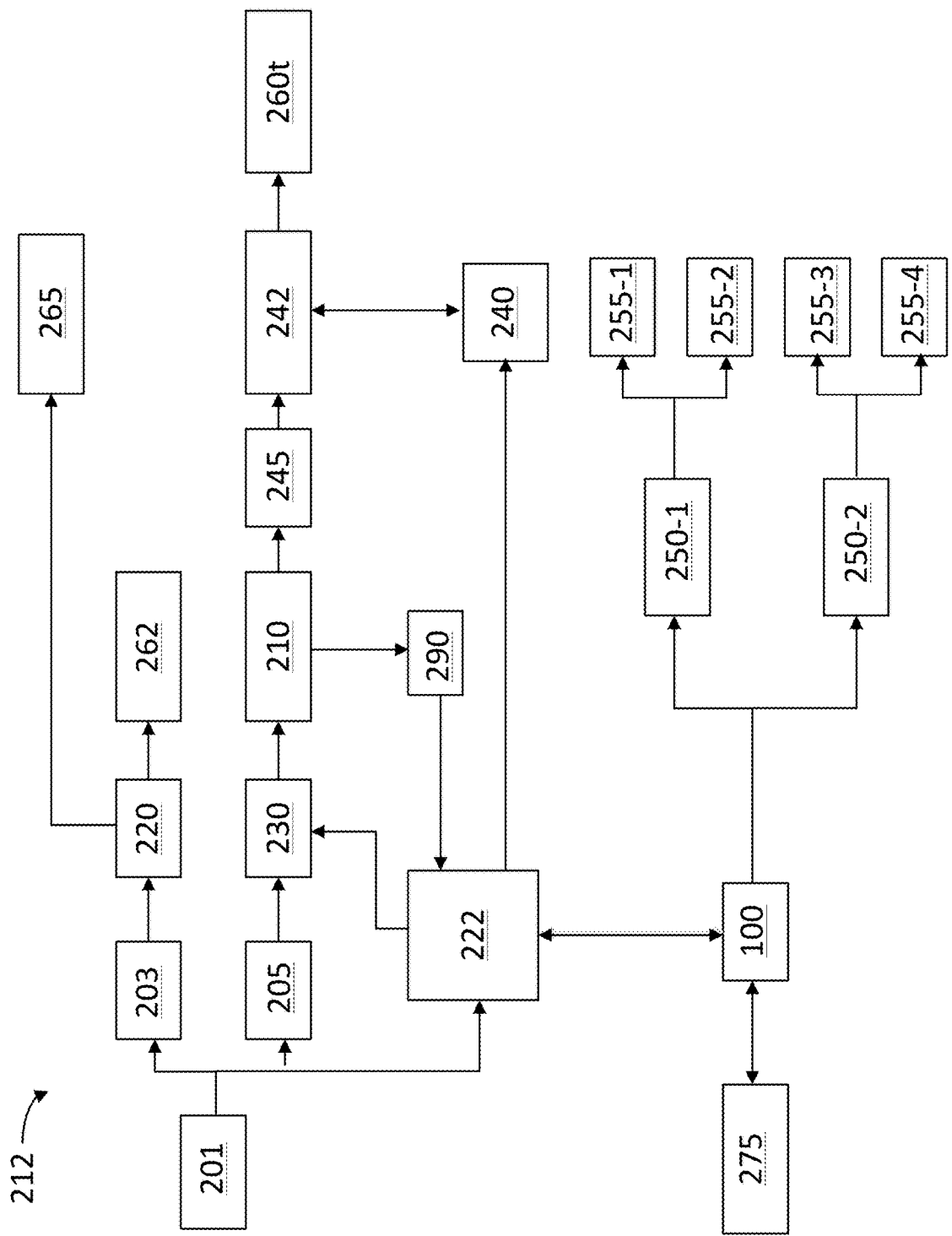
FIG. 2 is a schematic illustration of a PTU including a voltage source to provide a voltage reference input, according to some embodiments.

FIG. 2 is a schematic illustration of a PTU 212, according to some embodiments. PTU 212 includes antenna 275, consistent with the present disclosure (e.g., antenna 165). MCC 100 couples power signal (e.g., at 3.3V and +12 C) to a transmitter 222 (e.g., an application-specific IC, ASIC). MCC 100 provides a control signal to LED driver #1 250-1 and to LED driver #2 250-2 (hereinafter, collectively referred to as "LED drivers 250"). LED drivers 250 provide signals to turn on/off RGB emitters 255-1 through 255-4 (hereinafter, collectively referred to as "RGB emitters 255"). Accordingly, RGB emitters 255 light up when PTU 212 is ready for wirelessly transferring power to a mobile device (e.g., PRU 14).

In some embodiments, transmitter 222 transmits a power signal (e.g., at 5V and 6.78 MHz) to gate driver 230. A matching feedback circuit 240 provides adjustable tuning. A protection circuit 290 may include an over voltage protection (OVP) circuit, an over charge protection (OCP) circuit, or an over temperature protection (OTP) circuit. Protection circuit 290 also provides an indication of local faults to transmitter 222. The local faults may include an excess voltage, excess charge, or excess temperature. Fault conditions as above may be desirably avoided when transmitter 222 operates in resonance. Accordingly, protection circuit 290 prevents damage to a power amplifier 210 from feedback if there is too much RF reflection from RF receiver 260t In some embodiments, OVP circuit prevents overcoupling and damage to a device and system components in a resonant magnetic environment (e.g., at 13.56 MHz, 6.78 MHz, or lower frequencies).

An input power 201 may be used to provide a power signal (e.g., at 18V and 3-5 A) to a source voltage block 203 (e.g., AUX VDD), which sends a power signal (e.g., at 5V) to transmitter 220, to be transferred to the PRU through RF antenna 265 (e.g., at 915 MHz). Transmitter 220 (e.g., a RF transmitter) couples a power signal from source voltage block 203 (e.g., at 5V and 1.8 A) to a "smart" device 262 for smart device integration.

A source voltage source 205 (VDD) provides a power signal (e.g., at 6V and 2 A) to gate driver 230. Power amplifier 210 amplifies the RF signal from gate driver 230. The amplified RF signal is passed through an electromagnetic interference (EMI) filter 245 to remove spurious frequency components. Matching network switch 242 directs the amplified and filtered RF signal to a specific network or network device located within range of PTU 212. RF antenna 220 transmits an inductively coupled power signal to the device in the matching network.

Figure 3:
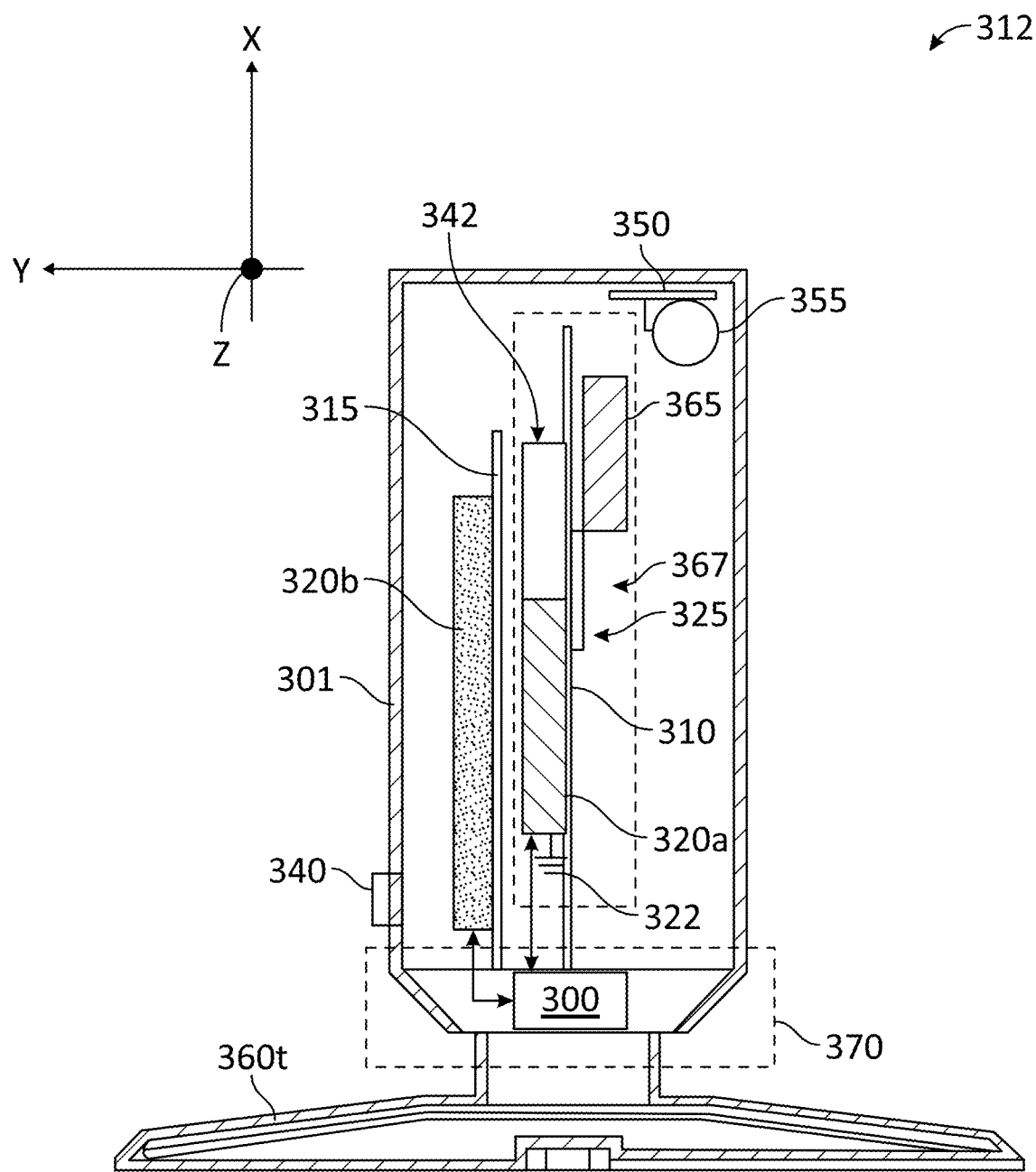
FIG. 3 is a schematic illustration of a PTU enshrouded in a cylindrical body, according to some embodiments.

FIG. 3 is a schematic illustration of a PTU 312, according to some embodiments. In some embodiments a processor 300 is configured to identify a PRU in the vicinity of PTU 312 (e.g., PRU 14) and to determine a range configuration relative to the PRU. Antenna 365 is configured to emit a propagating radiation (e.g., directed power signals 16 and 116) at a selected frequency and in a selected direction. PTU 312 also includes a power transmitting circuit 320a configured to provide a signal at the selected frequency to antenna 365 when processor 300 identifies the PRU within a far field configuration from PTU 312. A ground plate 310 is configured to couple a ground terminal 322 of power transmitting circuit 320a with antenna 365. Antenna 365 is coupled with power transmitting circuit 320a through a connector 325 (e.g., a coaxial cable).

Antenna 360t is configured to generate an inductively coupled field at a second frequency to provide a power signal (e.g., inductively coupled fields 18, and 118) to the PRU when processor 300 identifies the PRU within a near field configuration from PTU 312. In some embodiments, antenna 360t is an inductive coil and receives the power signal from a second power transmitting circuit 320b mounted on a substrate 315 (e.g., a resonant PCBA) configured to provide a signal to antenna 360t at a second frequency. In some embodiments, antenna 360t may be formed in a plate substantially orthogonal to antenna assembly 367. Power transmitting circuit 320a and power transmitting circuit 320b will be collectively referred to, hereinafter, as "power transmitting circuits 320."

In some embodiments, ground plate 310, power transmitting circuits 320, and substrate 315 include substantially co-planar surfaces that fit along a diameter of a cylindrical body 301. More generally, body 301 may have any geometry according to the specific application and manufacturing capabilities for PTU 312. A button 340 may be included to manually activate or de-activate antenna 360t.

In some embodiments LED driver 350 is configured to turn 'on' or 'of' a LED 355 to indicate when PTU 312 is operating in a directed energy, power transfer mode (e.g., directed power transfer mode, a) or in a second power transfer mode (e.g., inductively coupled power transfer, b) based on the range configuration determined by processor 300.

In some embodiments, PTU 312 includes a matching network switch 342 coupled with the power transmitting circuit 320a and configured to provide multiple signals at multiple frequencies within a selected bandwidth for antenna 365, wherein each of the multiple signals is directed to a different power receiving unit.

In some embodiments, antenna 365 and ground plate 310 form an antenna assembly 367. In some embodiments, antenna assembly 367 is mounted on a rotational mount 370 having a rotation axis in the planar surface of ground plate 310. Accordingly, rotational mount 370 may be configured to rotate about the rotation axis, thereby rotating antenna assembly 367 in a plane (e.g., YZ plane in FIG. 3) substantially orthogonal to the planar surface of the plate (e.g., XZ plane in FIG. 3). In some embodiments, antenna assembly 367 may be rotated by rotating the entire enclosure (e.g., body 301). In some embodiments, PTU 312 may be configured to track the movement of a PRU by sensors, or direct communication with the PRU. Accordingly, rotational mount 370 may rotate (e.g., via a brushless motor or servo) to maximize power transfer and efficiency to the PRU. Such configurations may be desirable when the PRU is expected to be in movement, while charging.

FIGS. 4A-B illustrate a cross section view and a plan view of a ground plate 410, respectively, according to some embodiments.

In some embodiments, ground plate 410 includes a multilayer stack including a first trace layer 412-1, power plane 414, a second trace layer 412-2 (hereinafter, collectively referred to as "trace layers 412"), and a ground layer 416 coupled to ground.

FIG. 4B illustrates an embodiment wherein ground plate 410 includes a planar surface 415. In some embodiments, planar surface 415 fits within a cross section along a diameter of cylindrical body 301 enshrouding antenna assembly 367. The XZ plane is consistent with the XYZ coordinate system in FIG. 3.

Figure 5B:
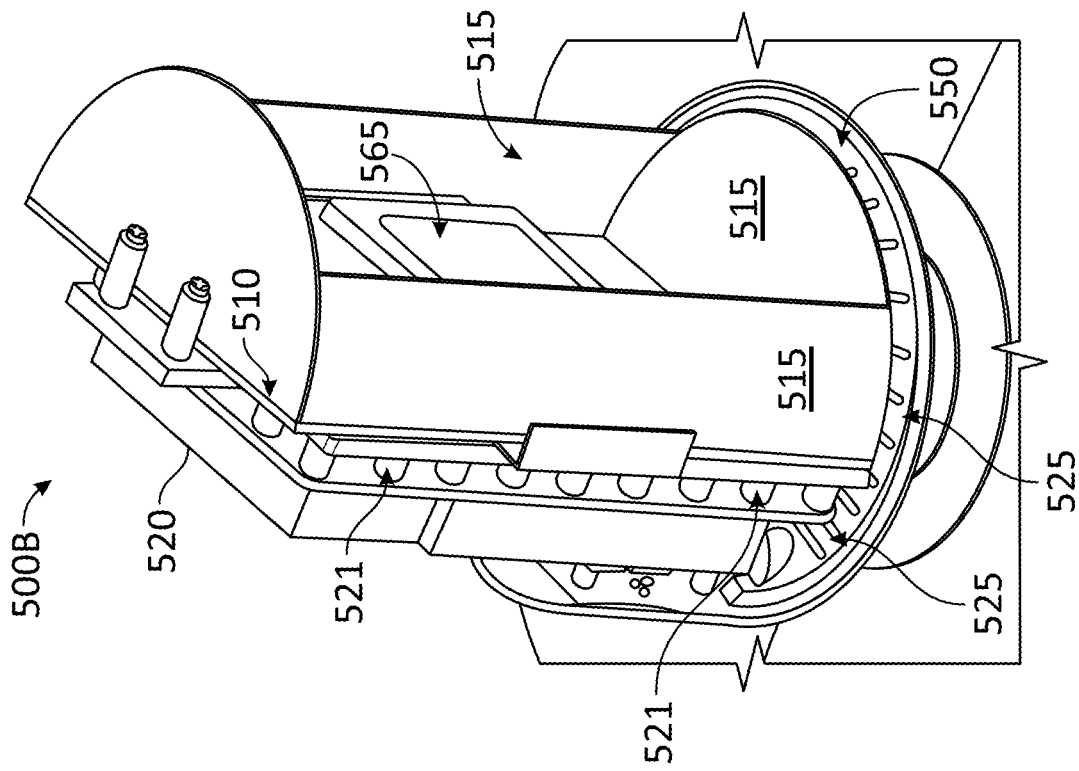
FIGS. 5A-B illustrate perspective views of RF antenna assemblies for a PTU, according to some embodiments.
Figure 5A:
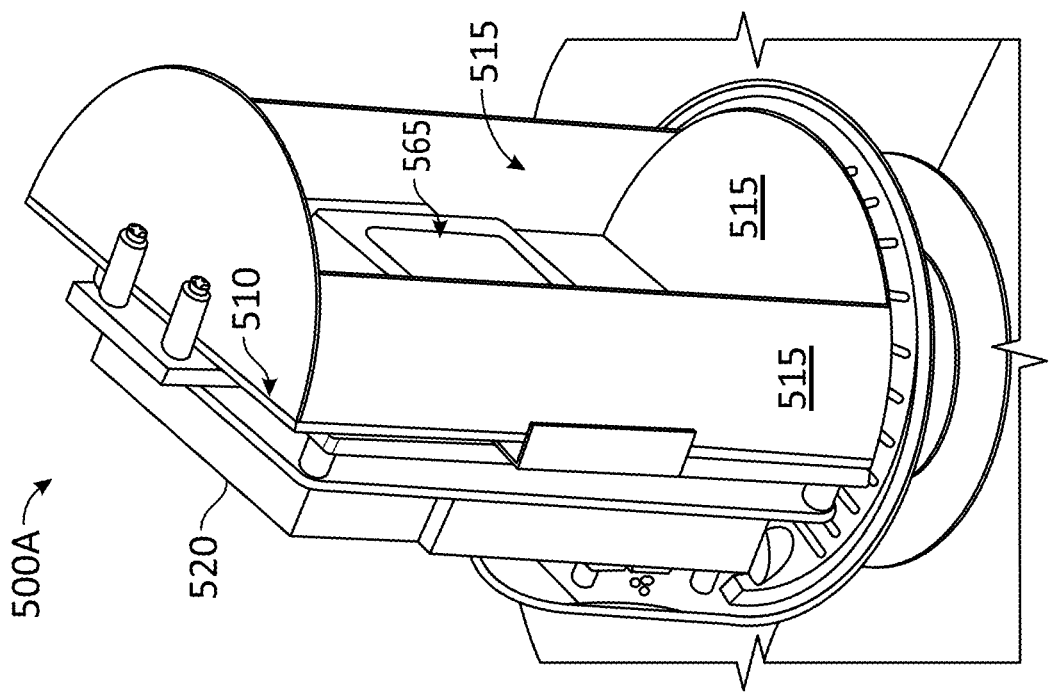

FIGS. 5A-B illustrate perspective views of antenna assemblies 500A and 500B for a PTU, according to some embodiments. Hereinafter, antenna assemblies 500A and 500B will be collectively referred to as "antenna assemblies 500." Antenna assemblies 500 include antenna 565. Antenna 565 may include a ceramic dielectric surrounding a coiled conductor in a plane parallel to the planar surface of the plate. In some embodiments, ground plate 510 includes top and side extensions 515 angled in a direction of increased directivity of the propagating radiation.

In assembly 500B, ground contacts 521 provide electrical coupling between the ground of a power transmitting circuit 520 and a ground plate 510 (along the entire back of a planar surface in ground plate 510). In some embodiments, antenna assemblies 500 include a coated bottom surface 525 coated with metal to ground the back PCB to the bottom metal plate 550. In some embodiments, bottom surface 525 may be affixed with copper tape to bottom metal plate 550.

Figure 6A:
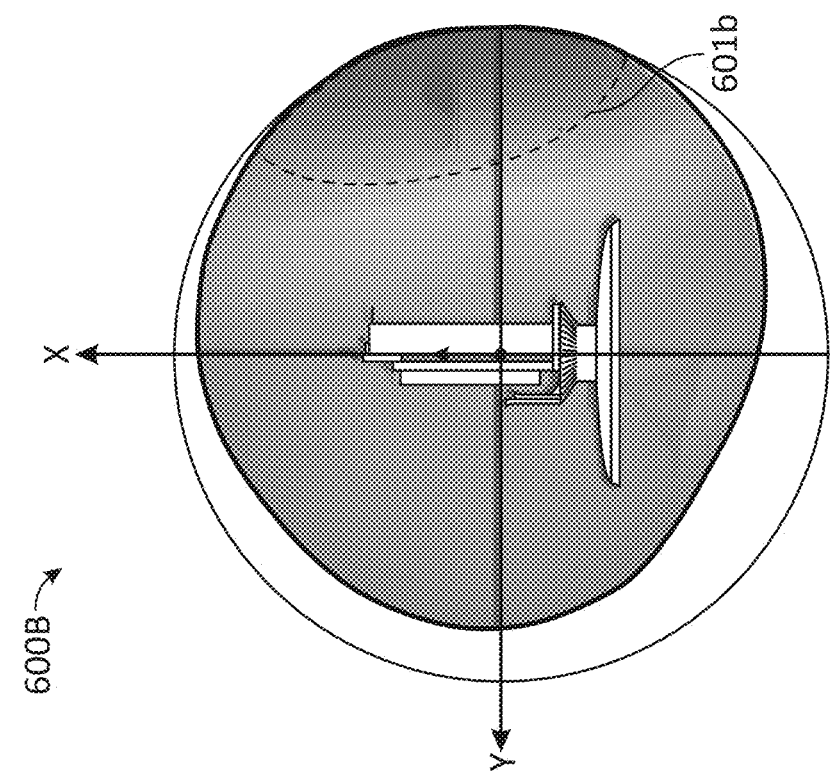
FIGS. 6A-B illustrate electromagnetic propagation results from the RF assemblies of FIGS. 5A-B, respectively, according to some embodiments.
Figure 6B:
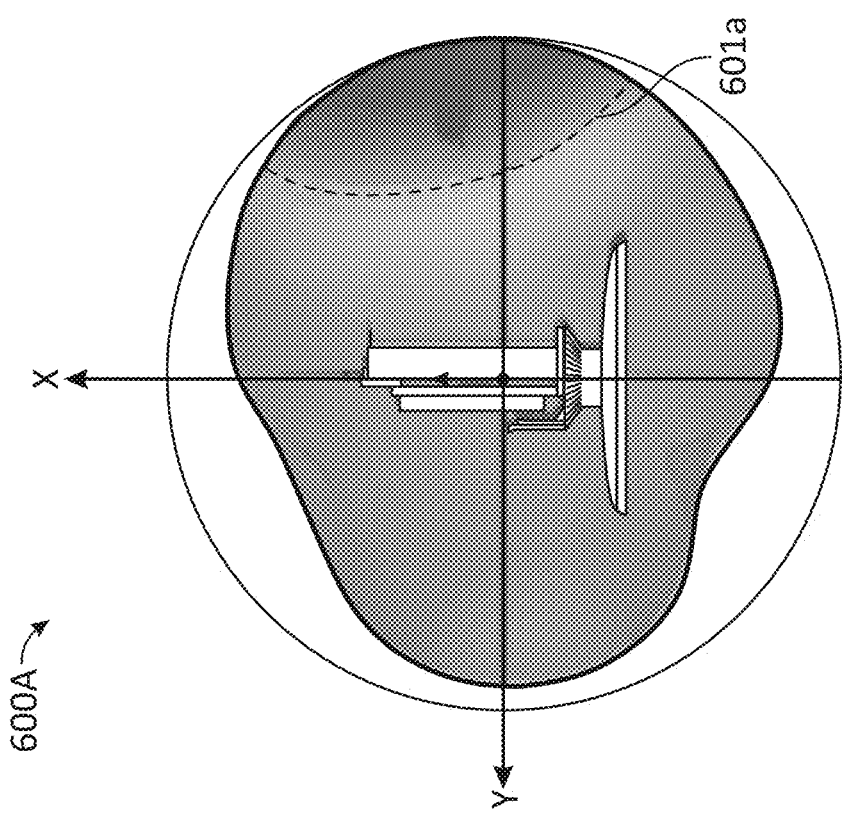

FIGS. 6A-B illustrate charts 600A-B, respectively, indicating electromagnetic propagation results from antenna assemblies 500, respectively, according to some embodiments. The RF frequency used in the modeling is, without limitation, about 900 MHz (e.g., 915 MHz).

Chart 600A illustrates a maximum direction 601a at about five decibels relative to isotropic (dBi) power (e.g., 5.035 dBi).

Chart 600B illustrates a maximum direction 601b at about four dBi (e.g., 4.364 dBi). As can be seen, additional ground contacts 521 tend to decrease the directivity of the RF radiation, while broadening the overall pattern towards the antenna side (−Y-direction). A broadened pattern may be desirable in some applications to provide a greater flexibility for transferring power to the PRU.

Figure 7C:
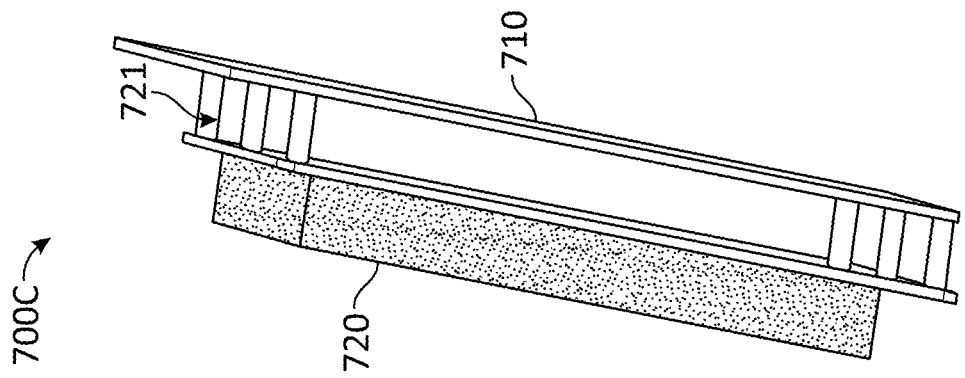
FIGS. 7A-C illustrate perspective views of RF antenna assemblies in a planar inverted-F (PIFA) configuration, according to some embodiments.
Figure 7B:
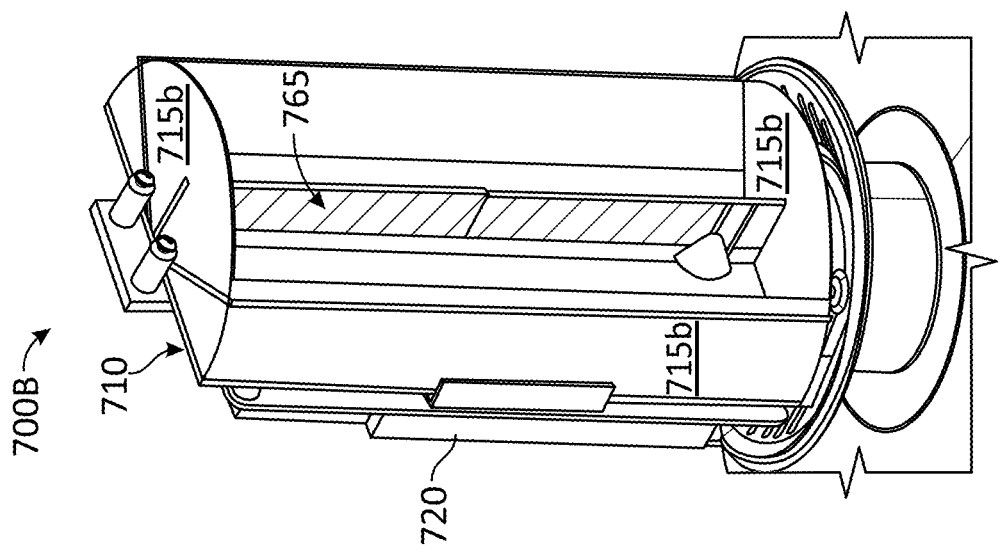
Figure 7A:
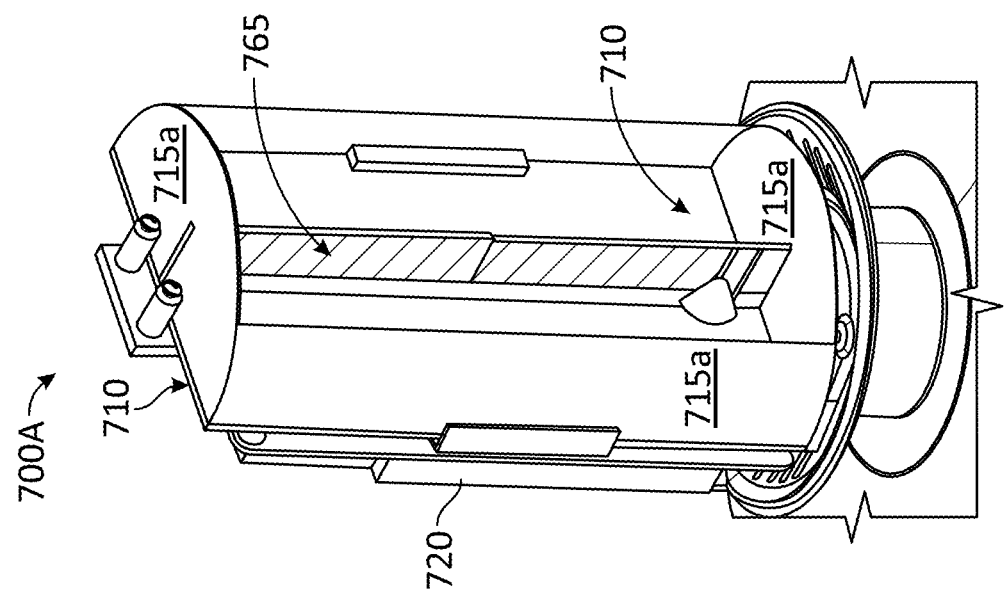

FIGS. 7A-C illustrate perspective views of antenna assemblies 700A, 700B, and 700C in a planar inverted-F (PIFA) configuration (hereinafter, collectively referred to as "PIFA antenna assemblies 700"), according to some embodiments.

PIFA antenna 700A includes a ground plate 710 coupled to a power transmitting circuit 720. Ground plate 710 includes top and side extensions 715a, similarly to ground plate extensions described above (e.g., extensions 515). PIFA antenna 700B includes a ground plate 710 with top and side extensions 715b, and PIFA antenna 700C includes ground plate 710 with side extension in FIG. 7C, for clarity) with additional ground contacts 721. Side extensions 715a and 715b will be collectively referred to, hereinafter, as "side extensions 715." In some embodiments, PIFA antennas 700 include a planar inverted-F architecture 765 laid on a plane substantially perpendicular to the planar surface of ground plate 710.

Figure 8C:
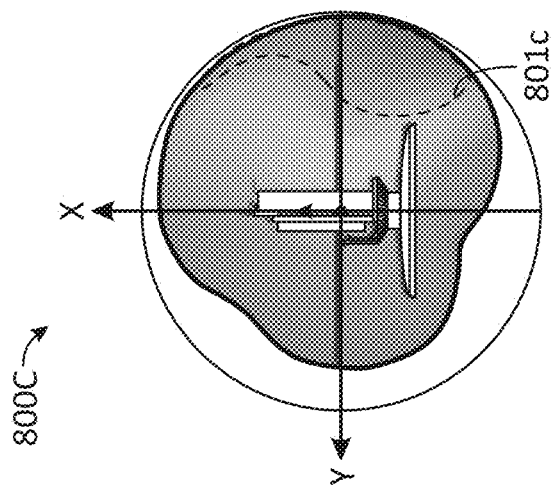
FIGS. 8A-C illustrate electromagnetic propagation results from the RF antenna assemblies of FIGS. 7A-C, according to some embodiments.
Figure 8B:
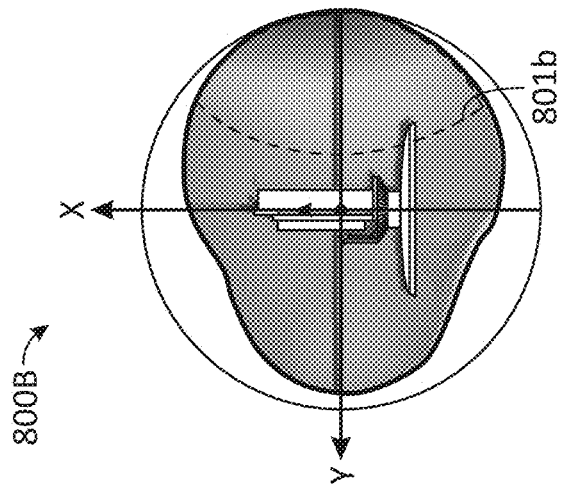
Figure 8A:
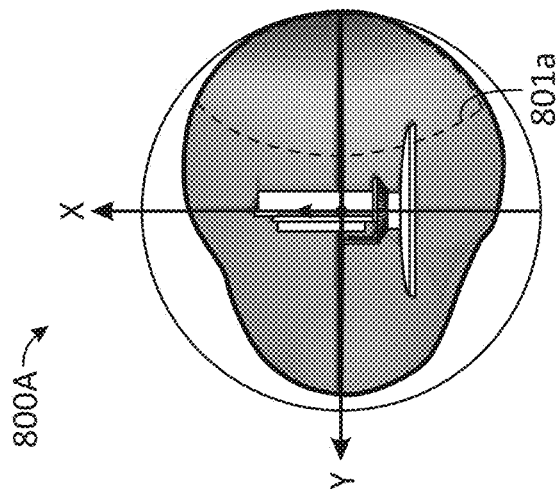

FIGS. 8A-C illustrate charts 800A-C, respectively, indicating electromagnetic propagation results from PIFA antenna assemblies 700, according to some embodiments. The RF frequency used in the modeling is, without limitation, about 900 MHz (e.g., 915 MHz).

Chart 800A illustrates a maximum direction 801a at about four dBi (e.g., 4.450 dBi).

Chart 800B illustrates a maximum direction 801b at about four dBi (e.g., 4.341 dBi).

Chart 800C illustrates a maximum direction 801c at about three dBi (e.g., 3.330 dBi).

FIGS. 9A-B illustrate perspective views of RF antenna assemblies 900A and 900B, respectively, in a monopole configuration, according to some embodiments. RF antenna assemblies 900A and 900B will be collectively referred to, hereinafter, as "monopole assemblies 900." Accordingly, monopole assemblies 900 may include antenna 965 having a conductive coil laid on a plane perpendicular to the planar surface of ground plate 910 including top and side extensions 915. Power transmitting circuit 920 includes elements similar to power transmitting circuits as disclosed herein (e.g., power transmitting circuits 520, 720) such as ground contacts 921 (e.g., ground contacts 521, and 721).

Figure 10B:
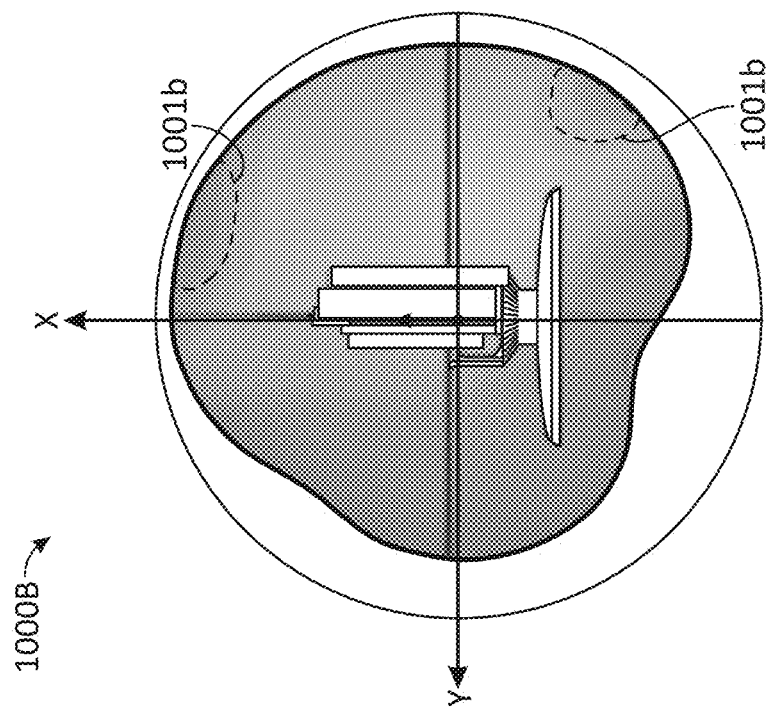
FIGS. 10A-B illustrate electromagnetic propagation results from the RF antenna assemblies of FIGS. 9A-B, respectively, according to some embodiments.
Figure 10A:
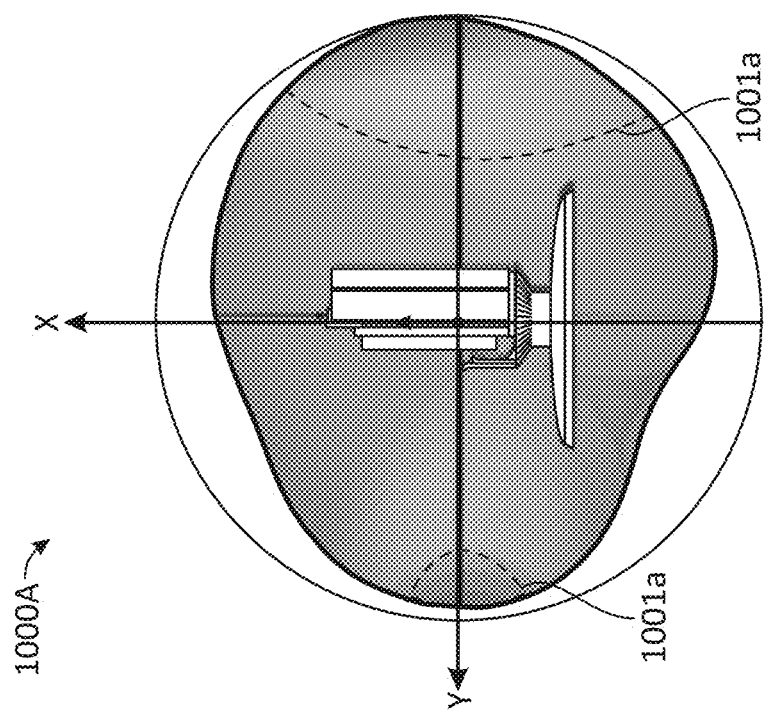

FIGS. 10A-B illustrate charts 1000A and 1000B respectively, indicating electromagnetic propagation results from monopole assemblies 900 according to some embodiments.

Chart 1000A illustrates a maximum direction 1001a at about three dBi (e.g., 3.407 dBi). Note that, although the dBi power in chart 1000A is somewhat lower than the previous charts (e.g., charts 600 and 800), maximum direction 1001a includes two orientations, along the negative Y-axis direction, and along the positive Y-axis direction.

Chart 1000B illustrates a maximum direction 1001b at about two dBi (e.g., 2.032 dBi). Note that, although the dBi power in chart 1000B is somewhat lower than the previous charts (e.g., charts 600 and 800), maximum direction 1001b includes two different azimuthal directions about the Y-axis.

FIGS. 11A-C illustrate perspective views of a RF antenna assemblies 1100A, 1100B, and 1100C in a larger monopole configuration relative to that of FIGS. 9A-B, according to some embodiments. RF antenna assemblies 1100A, 1100B, and 1100C will be collectively referred to, hereinafter, as "big monopole antenna assemblies 1100."

Big monopole antenna assemblies 1100 include a big monopole antenna 1165 and top and side extensions 1115. Big monopole antenna 1165 may include two planar surfaces 1167-1 and 1167-2 arranged perpendicularly to each other. In some embodiments, planar surface 1167-2 is disposed substantially parallel to the planar surface of conductive plate 1110, perpendicular to planar surface 1167-1. Further, in some embodiments, planar surface 1167-2 is a conductive surface. The length and width of planar surface 1167-2 may be adjusted according to the desired performance of antenna 1165. A ground plate 1125 may be plated with a metallic surface to contact conductive plate 1110. A power transmitting circuit 1120 includes elements similar to power transmitting circuits as disclosed herein (e.g., power transmitting circuits 520, 720, and 920), such as ground contacts 1121 (e.g., ground contacts 521, 721, and 921).

FIGS. 12A-C illustrate charts 1200A-C, respectively, indicating electromagnetic propagation results from big monopole antenna assemblies 1100, according to some embodiments. Charts 1200a, 1200b, and 1200c will be collectively referred to, hereinafter, as "charts 1200."

Chart 1200A illustrates a maximum direction 1201a at about five dBi (e.g., 5.172 dBi). Note that maximum direction 1201a includes two orientations, along the negative Y-axis direction, and along the positive Y-axis direction.

Chart 1200B illustrates a maximum direction 1201b at about five dBi (e.g., 5.637 dBi). Maximum direction 1201b includes two different azimuthal directions about the Y-axis.

Chart 1200C illustrates a maximum direction 1201c at about five dBi (e.g., 5.061 dBi). Maximum direction 1201c includes a broader azimuthal coverage about the Y-axis (in the −Y direction). Chart 1200C illustrates that in some embodiments an extension of ground plate 1110c that may be angled in a direction of increased directivity having a hemispherical breadth in a direction orthogonal to a plane of the first antenna.

Figure 13:
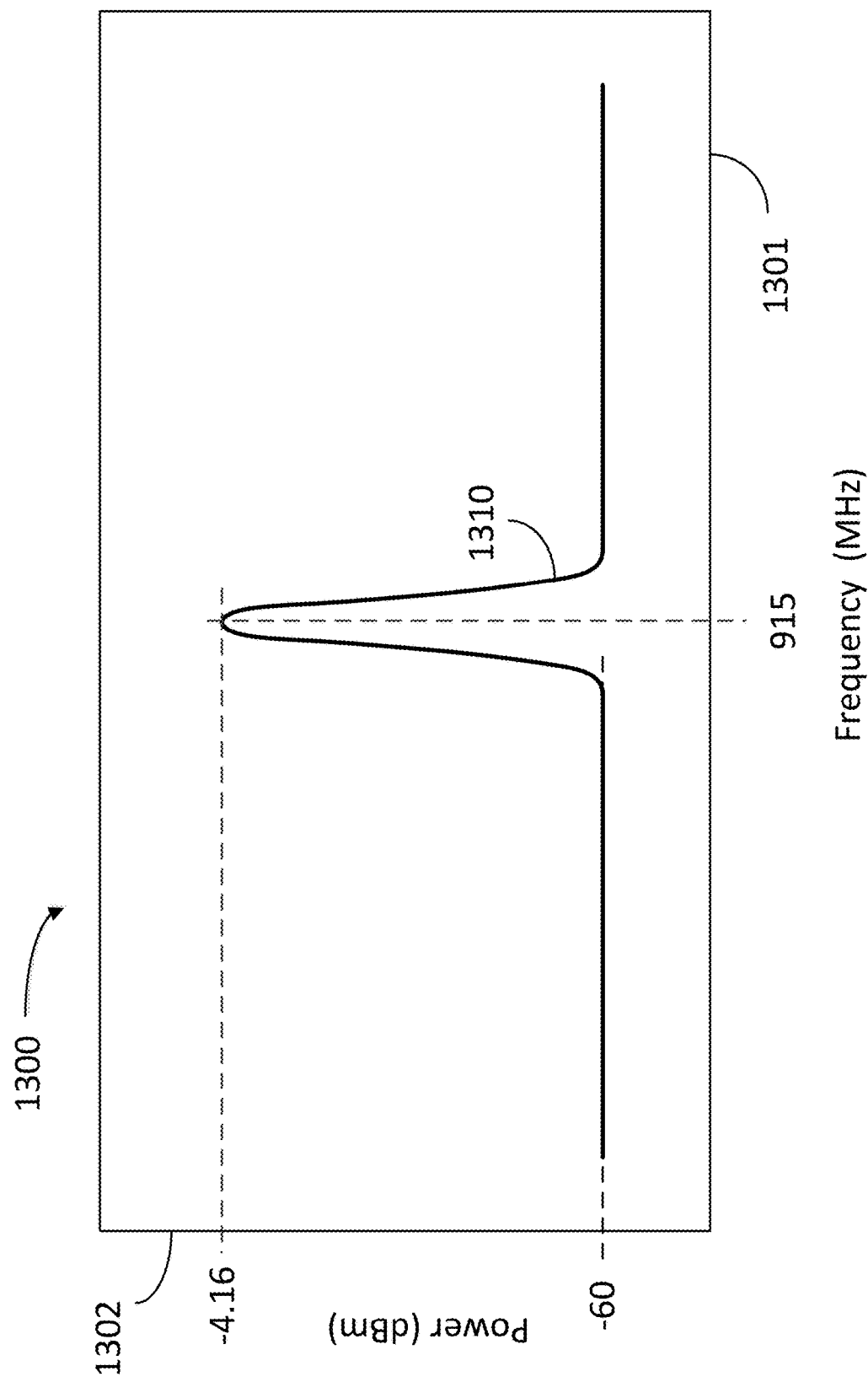
FIG. 13 illustrates a chart including a spectral transmission curve for a RF antenna in a PTU, according to some embodiments.

FIG. 13 illustrates a chart 1300 including a spectral transmission curve 1310 for a RF antenna in a PTU, according to some embodiments. The abscissae (X-axis) 1301 in chart 1300 indicates the frequency of the signal provided to the antenna (e.g., in MHz), and the ordinate (Y-axis) 1302 indicates the power output of the antenna at the specified frequency. For simplicity of illustration, the unit in ordinate 1302 is a logarithmic power unit (dBm). Without limitation and for illustrative purposes only, curve 1310 has a resonance ("peak") at 915 MHz. The resonance reaches a maximum power of −4.16 dBm (0 dBm=1 milliWatt in a logarithmic scale), with a floor level of −60 dBm this corresponds to a signal-to-noise level of greater than 55 dBm (e.g., the ratio between signal and noise at 915 MHz is close to 1 million).

Figure 14:
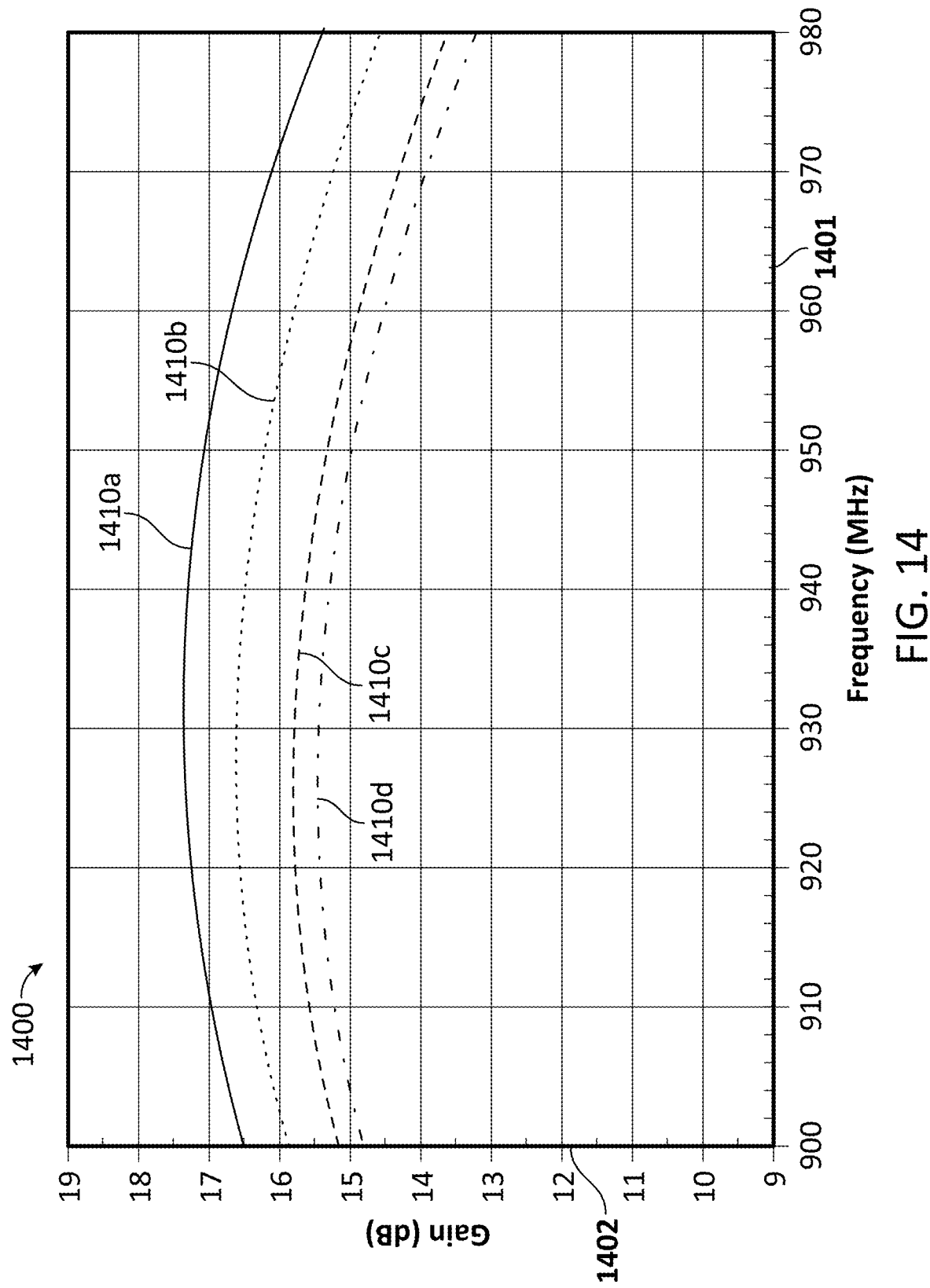
FIG. 14 illustrates a chart including spectral transmission curves for different temperatures in a PTU, according to some embodiments.

FIG. 14 illustrates a chart 1400 including spectral transmission curves 1410*a*, 1410*b*, 1410*c*, and 1410*d* (hereinafter, collectively referred to as "transmission curves 1400"), for different temperatures in a PTU, according to some embodiments. The abscissae 1401 and the ordinate 1402 in FIG. 14 are as described above (e.g., abscissa 1301 and ordinate 1302). Chart 1400 illustrates a fragment of chart 1300 showing the maximum power transmission efficiency for the antenna. More specifically, curve 1410*a* illustrates the maximum power transmission efficiency at −40 degrees Celsius (° C.). Curve 1410*b* illustrates the maximum power transmission efficiency of the antenna at 25° C. Curve 1410*c* illustrates the maximum power transmission efficiency of the antenna at 85° C., and curve 1410*d* illustrates the maximum power transmission efficiency of the antenna at 105° C.

Figure 15:
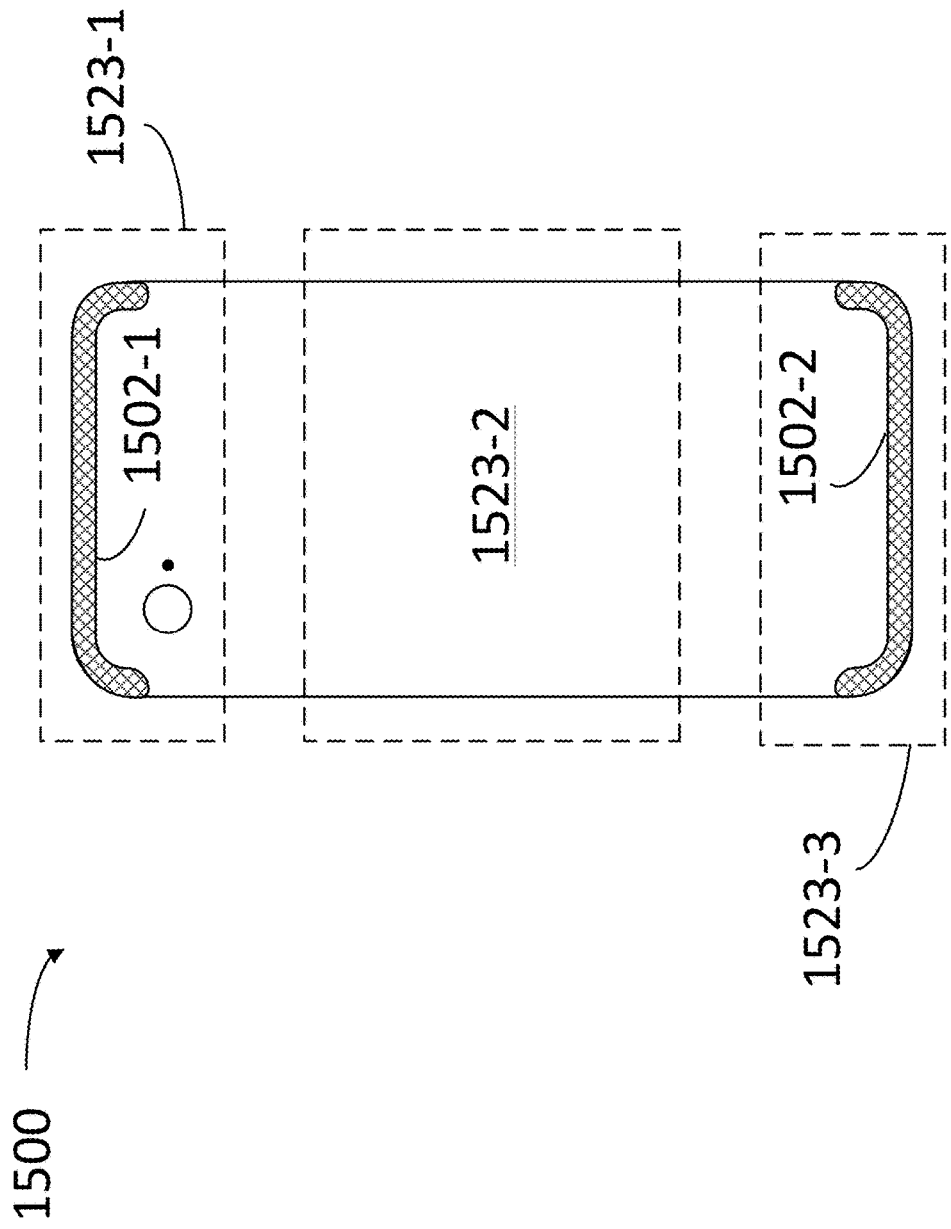
FIG. 15 illustrates a mobile device casing having slots and related features that may interfere with a power transfer process, according to some embodiments.

FIG. 15 illustrates a mobile device casing 1500 having slots 1502-1 and 1502-2 (hereinafter, collectively referred to as "slots 1502") and related features that may interfere with a power transfer process, according to some embodiments. Also, the power transfer process may interfere with the use of the mobile device (e.g., transmission and reception of RF signals) and is something to be considered when designing a PRU around a mobile device or devices that utilize RF for communications. Antennas in the mobile device may interact with a metal casing 1500, impacting the lifetime of a mobile device battery. For example, when the mobile device antennas are detuned by device casing 1500, the mobile device may require a higher power level for adequate transmission and reception of signals. Accordingly, the mobile device battery will tend to drain and drop calls (in the case of a cell phone or a smart phone).

Moreover, in some configurations mobile device casing 1500 may create electromagnetic interference (EMI) and RF noise, thus degrading signal quality, reducing network capacity and increasing the number of dropped calls. To compensate for signal quality degradation, some mobile devices increase the power usage, negatively impacting battery lifetime. Mobile device casing 1500 includes sensitive regions 1523-1, 1523-2, and 1523-3 (hereinafter, collectively referred to as "sensitive regions 1523") where antennas may be located.

In some embodiments the lower frequency antennas (RF below 1 GHz) may use the entirety of casing 1500 to radiate (e.g., including portion 1523-2). Higher frequency antennas (RF greater than 1.6 GHz) are more localized in the radiation (e.g., in sensitive regions 1523-1 and 1523-3)

It is recommended to design antennas in PTU devices as disclosed herein (e.g., PTUs 12, 112, 212, and 312) that take into account the mechanical features in PRUs that may arise as in sensitive regions 1523

In some embodiments, a selection of an antenna design for a PTU as disclosed herein includes performing EM simulations to select antenna architectures that are less affected by casing 1500. The effect of casing 1500 may be more pronounced for RF antennas operating on the 900-930 MHz frequency range (e.g., antennas 165, 265, 365, 565, 765, 965, and 1165).

To reduce EMI and noise from casing 1500, a PTU as disclosed herein may include a PIFA or a monopole style antenna (e.g., antennas 765, 965 and 1165) may include an enhanced depth of the PCB layer relative to the planar surface of the ground plate. In some embodiments, a PTU may include an on-ground chip antenna adjusted to operate at about 915 MHz. In some embodiments, to reduce EMI and noise from casing 1500 a PTU as disclosed herein may include a patch antenna (e.g., antennas 365 and 565) having a larger XY footprint and more directivity (e.g., larger maximum dBi gain).

Figure 16:
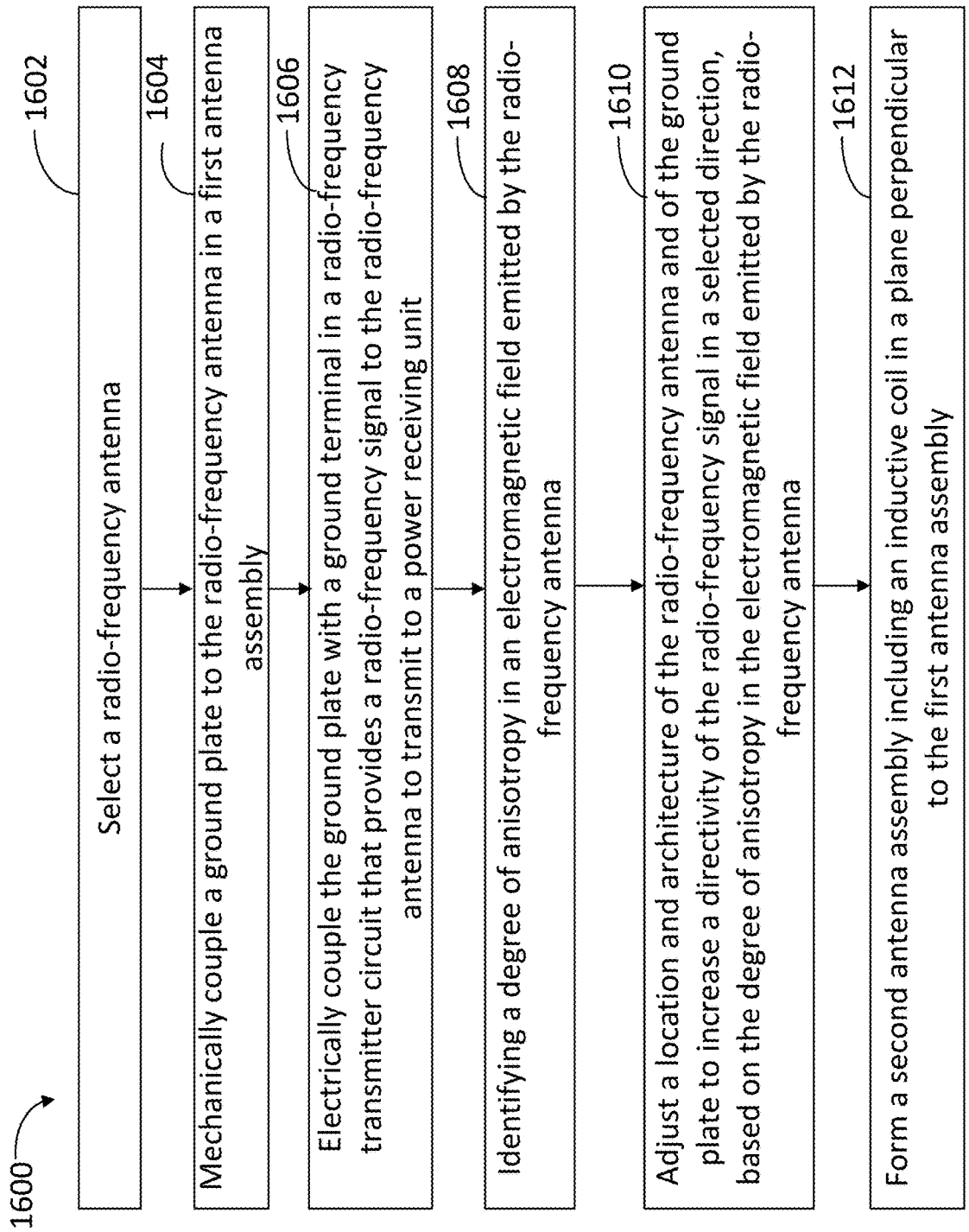
FIG. 16 illustrates a flow chart of a method for designing a RF antenna for use in a PTU to provide a directed energy signal to a PRU.

FIG. 16 illustrates a flow chart of a method 1600 for designing a RF antenna for use in a PTU to provide a directed energy signal to a PRU. Methods consistent with the present disclosure may include at least some, but not all of the steps illustrated in method 1600, performed in a different sequence. Furthermore, methods consistent with the present disclosure may include at least two or more steps as in method 1600 performed overlapping in time, or almost simultaneously. In embodiments consistent with method 1600, RF antenna is configured to generate a RF signal for transmission to a power receiving unit (e.g., directed power signals 16 and 116).

Step 1602 includes selecting a RF antenna. In some embodiments, step 1602 includes selecting a ground plate for the RF antenna.

Step 1604 includes mechanically coupling the ground plate to the RF antenna in a first antenna assembly. In some embodiments, step 1604 includes mounting the first antenna assembly on a rotational mount having a rotation axis in a planar surface of the plate, and configuring the rotational mount to rotate the first antenna assembly about the rotation axis.

Step 1606 includes electrically coupling the ground plate with a ground terminal in a RF transmitter circuit that provides a RF signal to the RF antenna to transmit to a PRU. In some embodiments, step 1606 includes selecting multiple ground couplings between the ground plate and the RF circuit.

Step 1608 includes identifying a degree of anisotropy in an electromagnetic field emitted by the radio-frequency antenna. In some embodiments, step 1608 includes performing an electromagnetic simulation to identify the degree of anisotropy of the RF signal transmitted by the RF antenna.

Step 1610 includes adjusting a location and a geometry of the RF antenna and of the ground plate to increase a directivity of the RF signal in a selected direction, based on the degree of anisotropy in the electromagnetic field emitted by the RF antenna. In some embodiments, step 1610 includes modifying one of the RF antenna, the location of the RF antenna, the ground plate for the RF antenna, and at least one of multiple ground couplings between the ground plate and the RF circuit to increase the RF signal transmission in a selected direction. In some embodiments, step 1610 includes forming an extension of a planar surface in the ground plate, the extension angled according to the selected direction. In some embodiments, step 1610 includes adding multiple ground couplings between the ground plate and the radio-frequency transmitter circuit to increase the degree of anisotropy in the electromagnetic field emitted by the radio-frequency antenna.

Step 1612 includes forming a second antenna assembly including an inductive coil in a plane perpendicular to the first antenna assembly.

Figure 17:
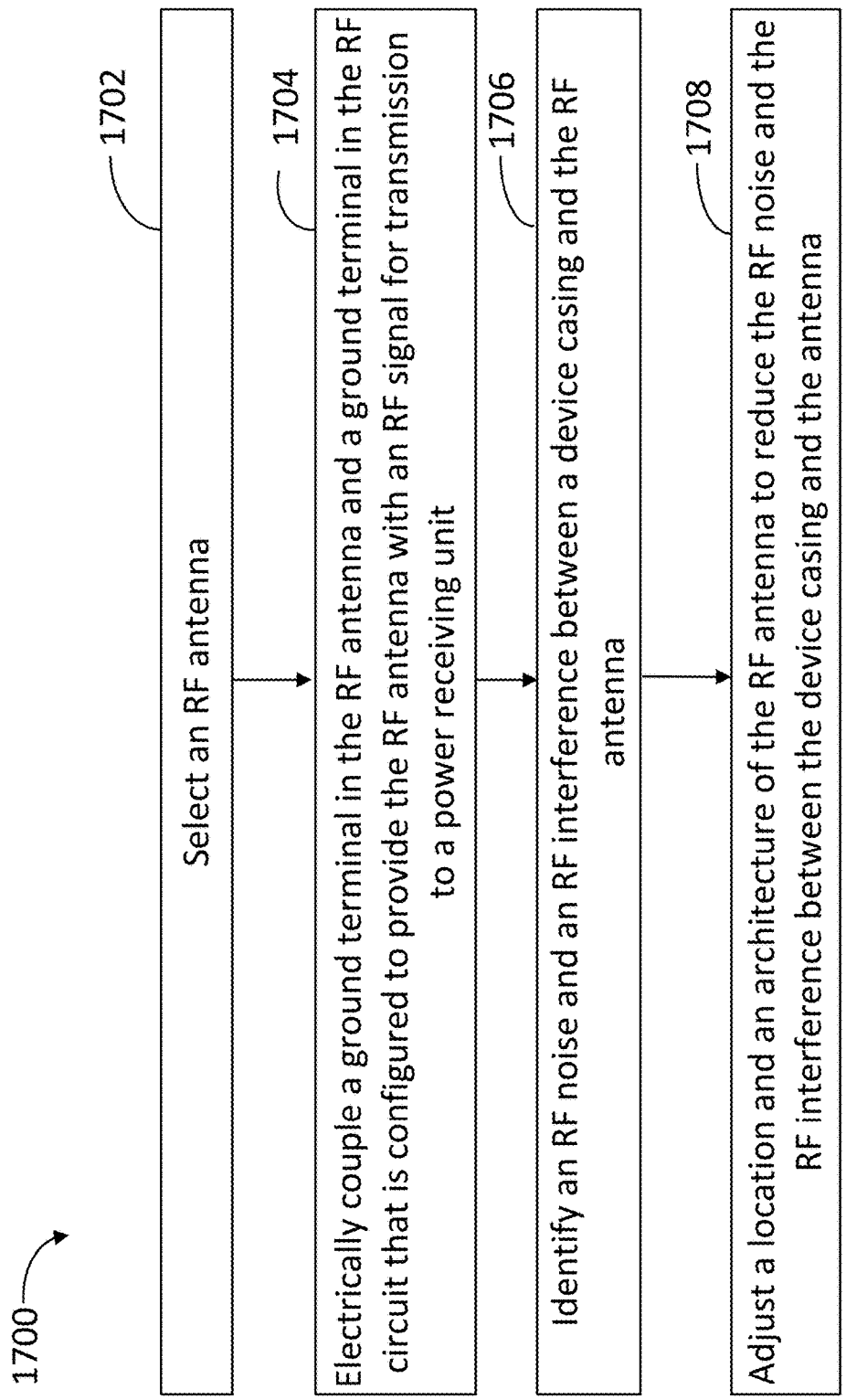
FIG. 17 illustrates a flow chart of a method for designing a RF antenna for use in a PTU to provide an inductively coupled field to a PRU.

FIG. 17 illustrates a flow chart of a method 1700 for designing a RF antenna for use in a PTU to provide an inductively coupled field to a PRU. Methods consistent with the present disclosure may include at least some, but not all of the steps illustrated in method 1700, performed in a different sequence. Furthermore, methods consistent with the present disclosure may include at least two or more steps as in method 1700 performed overlapping in time, or almost simultaneously. In embodiments consistent with method 1700, RF antenna is configured to generate a RF signal for transmission to a power receiving unit (e.g., directed inductively coupled field 18).

Step 1702 includes selecting a RF antenna. In some embodiments, the RF antenna includes an inductive coil configured to generate a RF magnetic field oscillating at frequencies within the range from about 80 kHz to about 300 kHz.

Step 1704 includes electrically coupling a ground terminal in the RF antenna and a ground terminal in the RF circuit that is configured to provide the RF antenna with a RF signal for transmission to a power receiving unit.

Step 1706 includes identifying a RF noise and a RF interference between a device casing and the RF antenna. In some embodiments, step 1706 includes performing an electromagnetic simulation to identify a RF noise and a RF interference between a device casing and the RF antenna.

Step 1708 includes adjusting a location and an architecture of the RF antenna to reduce the RF noise and the RF interference between the device casing and the antenna.

Figure 18:
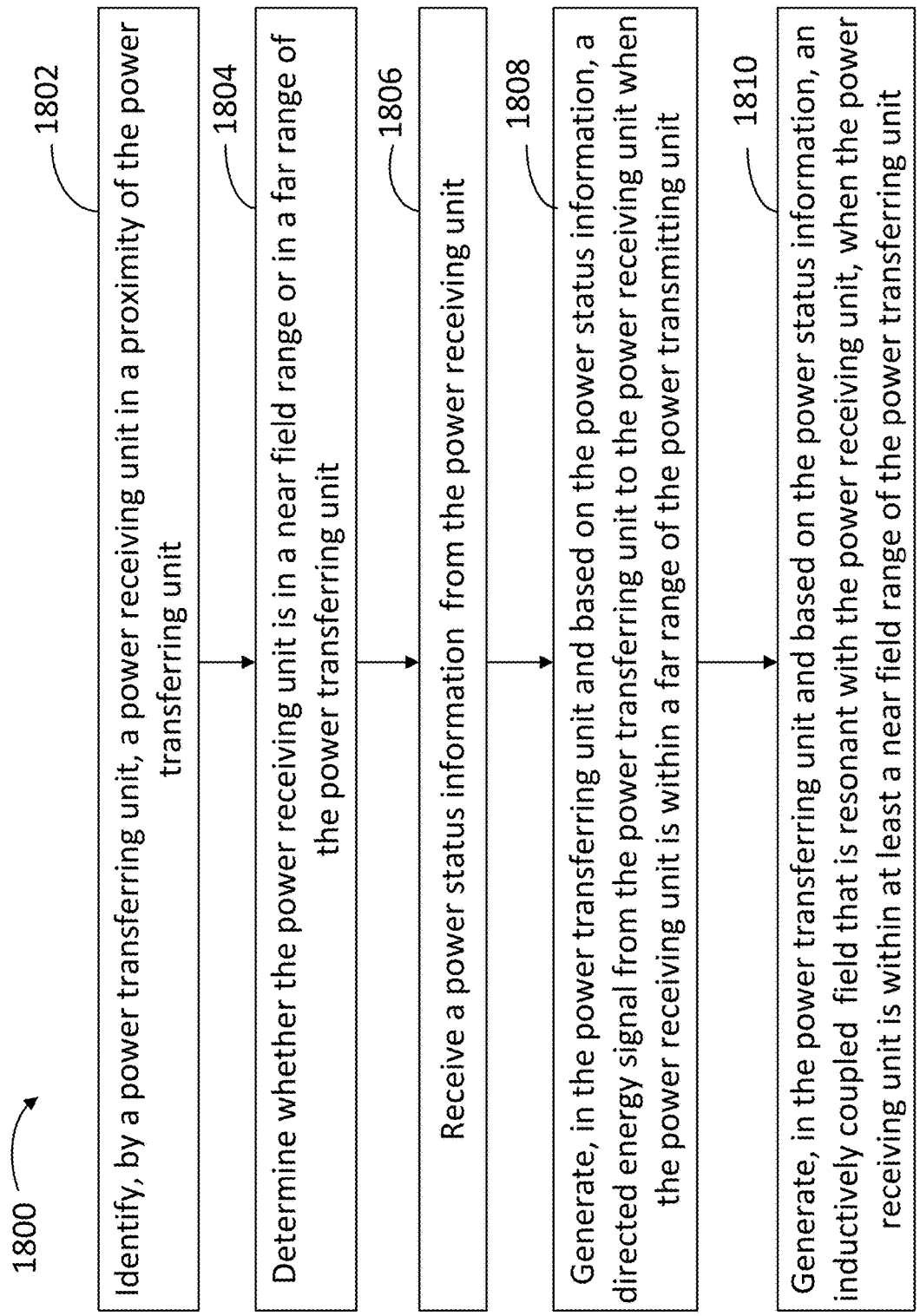
FIG. 18 is a flowchart illustrating steps in a method for managing, from a power receiving unit, a power transfer from a PTU, according to some embodiments.

FIG. 18 illustrates a flow chart of a method 1800 for intelligent power transfer management via either the MCC in the PTU or the MCC in the PRU where applicable, based on power priority. The PRU provides the transferred power to charge or re-charge a battery (e.g., battery 170). Method 1800 may be performed at least partially by any one of MCC circuits installed in the PTU device, (e.g., MCC 29, and MCC 100), while communicating with each other through a communications circuit (e.g., communications circuits 32, and 132). In some embodiments, method 1800 is partially performed by a PTU in communication with one or more PRU's roaming in the proximity of the PTU. Each of the one or more PRU's may be handled by a user having access authorization to a power charging service of the PTU. At least some of the steps in method 1800 may be performed by a processor executing commands stored in a memory (e.g., MCC 29, and MCC 100 and memory 155). Methods consistent with the present disclosure may include at least some, but not all of the steps illustrated in method 1800, performed in a different sequence. Furthermore, methods consistent with the present disclosure may include at least two or more steps as in method 1800 performed overlapping in time, or almost simultaneously.

Step 1802 includes identifying, by the PTU, a PRU in the proximity of the PTU.

Step 1804 includes determining whether the PRU is in a near field range or in a far field range of the PTU. In some embodiments, step 1804 may include determining a geolocation of the PRU by communicating with the communication circuit in the PRU. Further, in some embodiments step 1804 may include determining that the PRU is in the near field range when the PRU is within a few millimeters (mm), e.g., 2 mm, 3 mm, or less than 5, 10 mm, or 20 mm. In some embodiments, step 1804 may include determining that the PRU is in the far field range of the PTU when the PRU is within a few meters (m) of the PTU (e.g., 1 m, 2 m, or 5 to 10 m). In some embodiments, the near field range can extend further distances, such as 6-8 inches (e.g., about 15-40 cm), depending on power transfer efficiency and safety considerations. In some embodiments, a far field range may include distances of about 1-2 meters, or 3-12 meters. In some embodiments, efficient RF power transfer can be achieved from 1-12 meters in a far field range.

Step 1806 includes receiving a power status information from the PRU. In some embodiments, step 1806 may include receiving a charge percentage of a battery in the PRU (e.g., 10%, 50%, or 100% and the like). In some embodiments, step 1806 may also include receiving a "time remaining" for the operation of the PRU, based on the power status, current usage conditions, and other environmental factors (e.g., temperature and the like). For example, in some embodiments step 1806 may include receiving from the PRU a message as "10 minutes (min) remaining," "5 min. remaining," and the like.

Step 1808 includes generating, in the PTU and based on the power status information, a directed energy signal from the PTU to the PRU when the PRU is within a far range of the PTU. In some embodiments, step 1808 includes adjusting an antenna assembly in the power transferring unit in a direction of increased directivity of the directed energy signal when the power receiving unit is within the far range of the power transferring unit.

Step 1810 includes generating, in the PTU and based on the power status information, an inductively coupled field that is resonant with the PRU, when the PRU is within at least a near field range of the PTU. In some embodiments, step 1810 includes generating a radio-frequency magnetic field oscillating at a frequency between 80 kHz and 300 kHz.

The foregoing detailed description has set forth various embodiments of devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the disclosure and the scope of the appended claims.

The term "machine-readable storage medium" or "computer readable medium" as used herein refers to any medium or media that participates in providing instructions or data to processor for execution. Such a medium may take many forms, including, but not limited to, non-volatile media, volatile media, and transmission media. Non-volatile media include, for example, optical disks, magnetic disks, or flash memory (e.g., memories 155). Volatile media include dynamic memory (e.g., memory 155). Transmission media include coaxial cables, copper wire, and fiber optics, including the wires that comprise a bus. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A device for wirelessly transferring charging or operating power to a load coupled to a power receiving device, comprising:
   a processor configured to identify the power receiving device and to determine a range configuration relative to the power receiving device;
   a first antenna comprising a dielectric surrounding a coiled conductor configured to emit a propagating radiation at a selected frequency and in a selected direction;
   a first power transmitting circuit having a ground terminal and configured to provide a power signal at the selected frequency to the first antenna when the processor identifies the power receiving device within a far field configuration from the device; and
   a plate configured to couple the ground terminal of the first power transmitting circuit with the first antenna and comprising a planar surface substantially parallel to the first antenna and at least an extension from the planar surface angled in a direction of the propagating radiation.

2. The device of claim 1, further comprising a second antenna configured to generate an inductively coupled field at a second frequency to provide power to the power receiving unit when the processor identifies the power receiving device within a near field configuration from the device, wherein the second antenna comprises an inductive coil and receives the power from a second power transmitting circuit.

3. The device of claim 1, further comprising an indicator configured to indicate whether the device is operating in a first power transfer mode or in a second power transfer mode based on the range configuration determined by the processor.

4. The device of claim 1, further comprising a matching network switch coupled with the first power transmitting circuit and configured to provide multiple power signals at multiple frequencies within a selected bandwidth for the first antenna, wherein each of the multiple power signals is directed to a different power receiving unit.

5. The device of claim 1, wherein the plate is a multilayer stack comprising two trace layers separated by a power plane, and a ground layer coupled with a ground terminal in the first power transmitting circuit.

6. The device of claim 1, wherein the first antenna comprises a ceramic dielectric surrounding the coiled conductor.

7. The device of claim 1, wherein the first antenna comprises a planar inverted-F antenna laid on a plane perpendicular to the planar surface of the plate.

8. The device of claim 1, wherein the first antenna comprises a monopole antenna including a conducting extension laid on a plane perpendicular to the planar surface of the plate.

9. The device of claim 1, wherein the extension of the plate is angled in a direction of increased directivity in opposite directions.

10. The device of claim 1, wherein the extension of the plate is angled in a direction of increased directivity in at least two propagating directions.

11. The device of claim 1, wherein the extension of the plate is angled in a direction of increased directivity having a hemispherical breadth in a direction orthogonal to a plane of the first antenna.

12. The device of claim 1, wherein the first antenna and the plate form a first antenna assembly, the first antenna assembly mounted on a rotational mount having a rotation axis in the planar surface of the plate, and wherein the rotational mount is configured to rotate about the rotation axis to rotate the first antenna assembly in a plane substantially orthogonal to the planar surface of the plate.

* * * * *